(12) United States Patent
Takeda et al.

(10) Patent No.: US 10,721,676 B2
(45) Date of Patent: Jul. 21, 2020

(54) USER TERMINAL, RADIO BASE STATION AND RADIO COMMUNICATION METHOD

(71) Applicant: NTT DOCOMO, INC., Tokyo (JP)

(72) Inventors: Kazuki Takeda, Tokyo (JP); Keisuke Saito, Tokyo (JP); Daiki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/099,546

(22) PCT Filed: May 8, 2017

(86) PCT No.: PCT/JP2017/017352
§ 371 (c)(1),
(2) Date: Nov. 7, 2018

(87) PCT Pub. No.: WO2017/195720
PCT Pub. Date: Nov. 16, 2017

(65) Prior Publication Data
US 2019/0141612 A1 May 9, 2019

(30) Foreign Application Priority Data
May 9, 2016 (JP) .................................. 2016-093945

(51) Int. Cl.
*H04W 48/10* (2009.01)
*H04W 16/28* (2009.01)
(Continued)

(52) U.S. Cl.
CPC ............ *H04W 48/10* (2013.01); *H04B 7/043* (2013.01); *H04B 7/063* (2013.01); *H04B 7/0695* (2013.01);
(Continued)

(58) Field of Classification Search
CPC ..... H04W 48/10; H04W 28/06; H04W 76/11; H04W 24/10; H04W 16/28; H04B 7/043
See application file for complete search history.

(56) References Cited

U.S. PATENT DOCUMENTS

| 9,750,003 B2 | 8/2017 | Yu et al. |
| 10,187,848 B2 * | 1/2019 | Mustapha ............. H04W 48/14 |

(Continued)

FOREIGN PATENT DOCUMENTS

| JP | 2016506667 A | 3/2016 |
| WO | 2015080646 A1 | 6/2015 |
| WO | 2015080649 A1 | 6/2015 |

OTHER PUBLICATIONS

International Search Report issued in PCT/JP2017/017352, dated Jul. 4, 2017 (3 pages).
Written Opinion of the International Searching Authority issued in PCT/JP2017/017352, dated Jul. 4, 2017 (7 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
(Continued)

*Primary Examiner* — Jean B Corrielus
(74) *Attorney, Agent, or Firm* — Osha Liang LLP

(57) ABSTRACT

The present invention is designed to reduce communication overhead in communication in which beamforming is used. A user terminal according to one aspect of the present invention has a transmission section that transmits a beam identification signal for identifying a given beam, a receiving section that receives given information transmitted in the given beam based on the beam identification signal, and a control section that controls transmission of the beam identification signal.

5 Claims, 15 Drawing Sheets

(51) Int. Cl.
*H04W 24/10* (2009.01)
*H04W 72/04* (2009.01)
*H04B 7/06* (2006.01)
*H04L 27/26* (2006.01)
*H04W 76/11* (2018.01)
*H04B 7/0426* (2017.01)
*H04W 28/06* (2009.01)

(52) U.S. Cl.
CPC ............ *H04L 27/26* (2013.01); *H04W 16/28* (2013.01); *H04W 24/10* (2013.01); *H04W 28/06* (2013.01); *H04W 72/0413* (2013.01); *H04W 76/11* (2018.02); *H04L 27/2602* (2013.01)

(56) References Cited

U.S. PATENT DOCUMENTS

| | | | |
|---|---|---|---|
| 2014/0348012 A1* | 11/2014 | Wu | H04W 24/08 370/252 |
| 2016/0277225 A1 | 9/2016 | Frenne et al. | |
| 2016/0308637 A1 | 10/2016 | Frenne et al. | |
| 2017/0279553 A1* | 9/2017 | Sadiq | H04J 11/0073 |

OTHER PUBLICATIONS

Extended European Search Report issued in the counterpart European Patent Application No. 17796081.2, dated Mar. 20, 2019 (7 pages).

Office Action issued in European Application No. 17796081.2, dated Jan. 29, 2020 (5 pages).

* cited by examiner

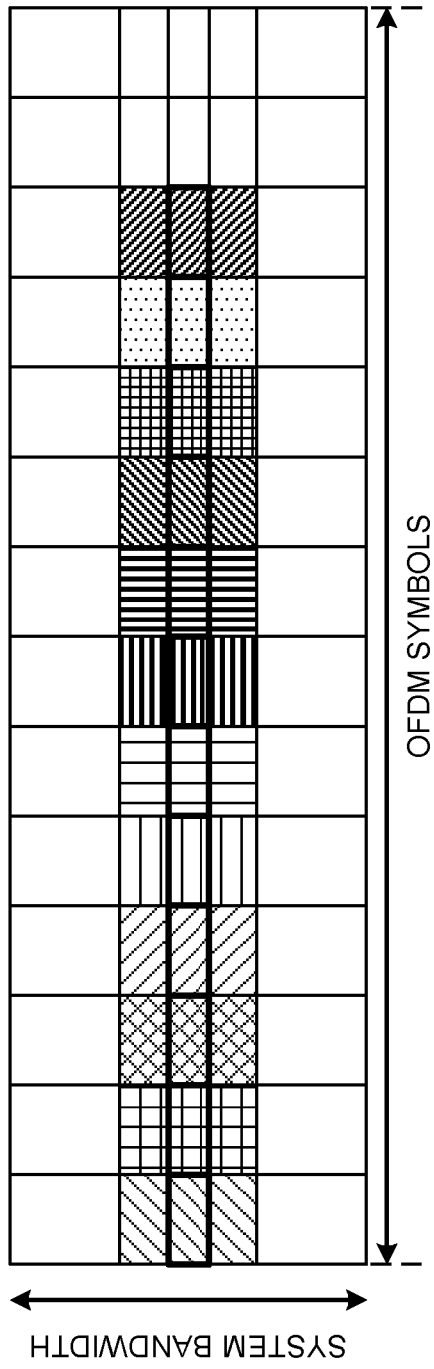
FIG. 2A
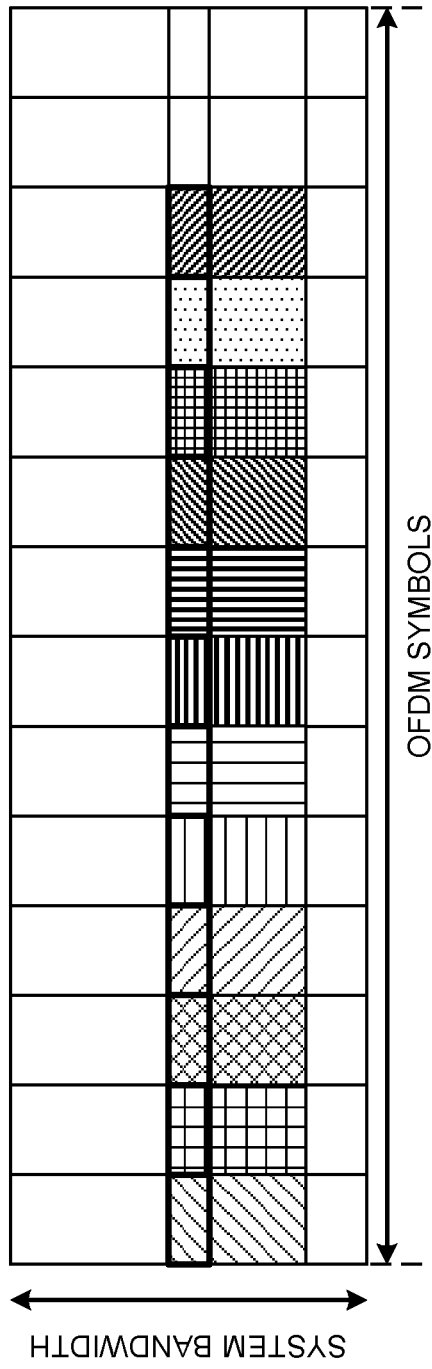
FIG. 2B

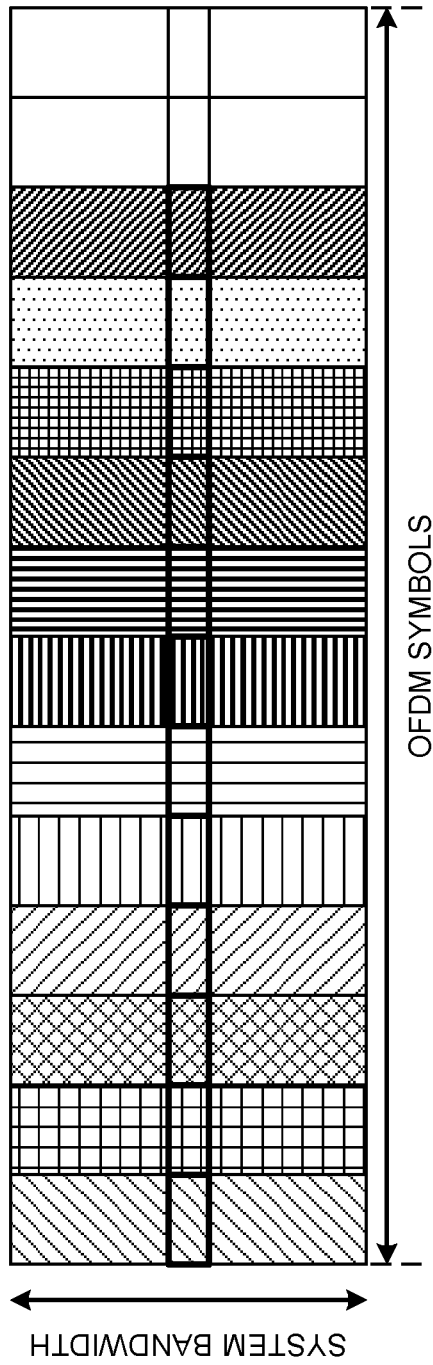
FIG. 3A
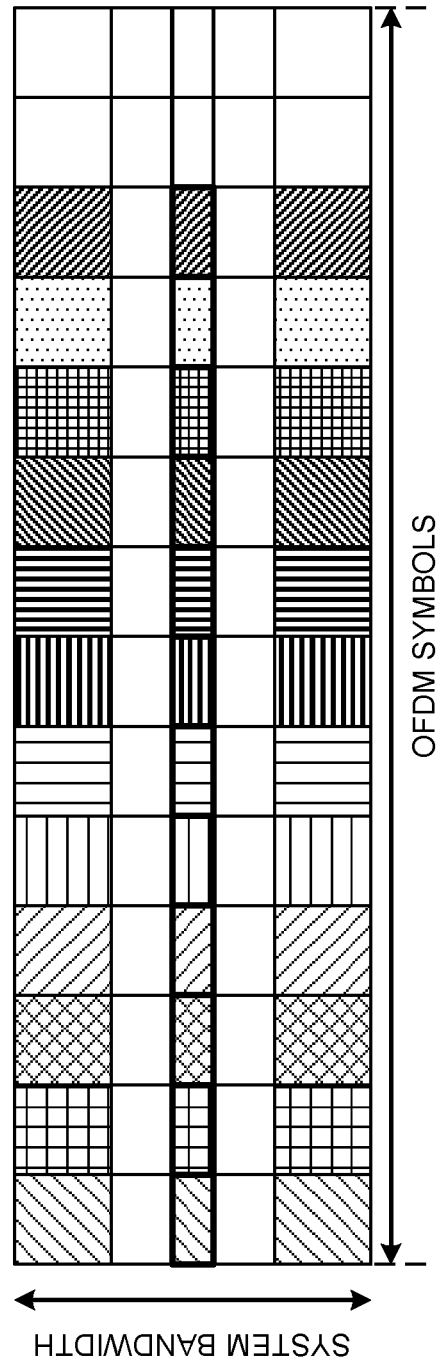
FIG. 3B

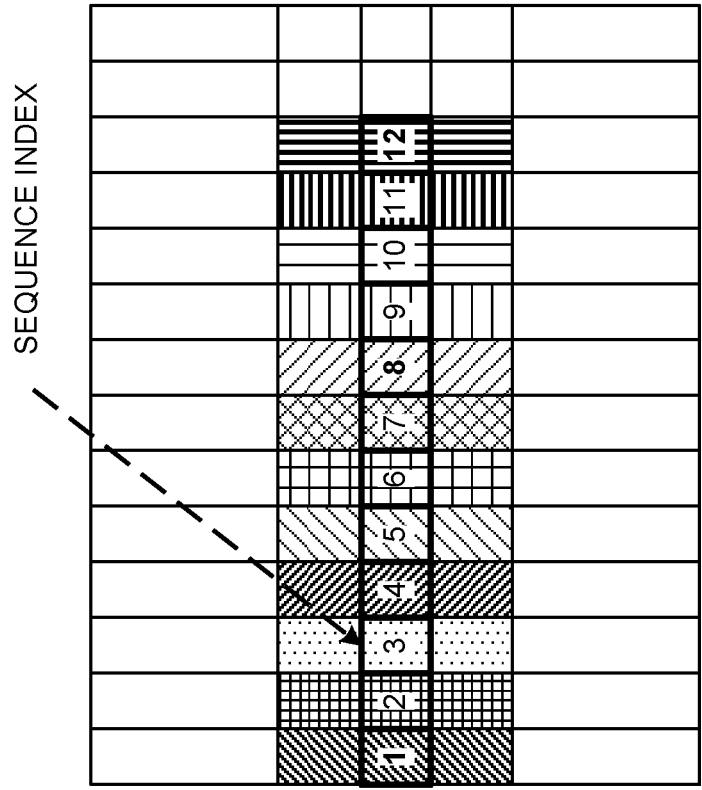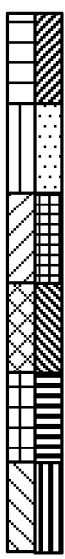
FIG. 5A
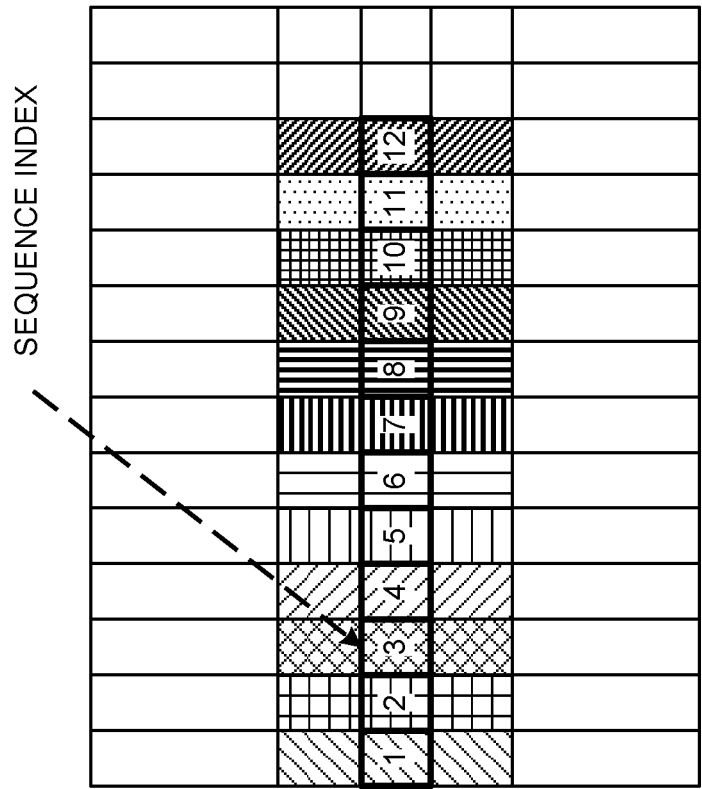
FIG. 5B

FIG. 6A
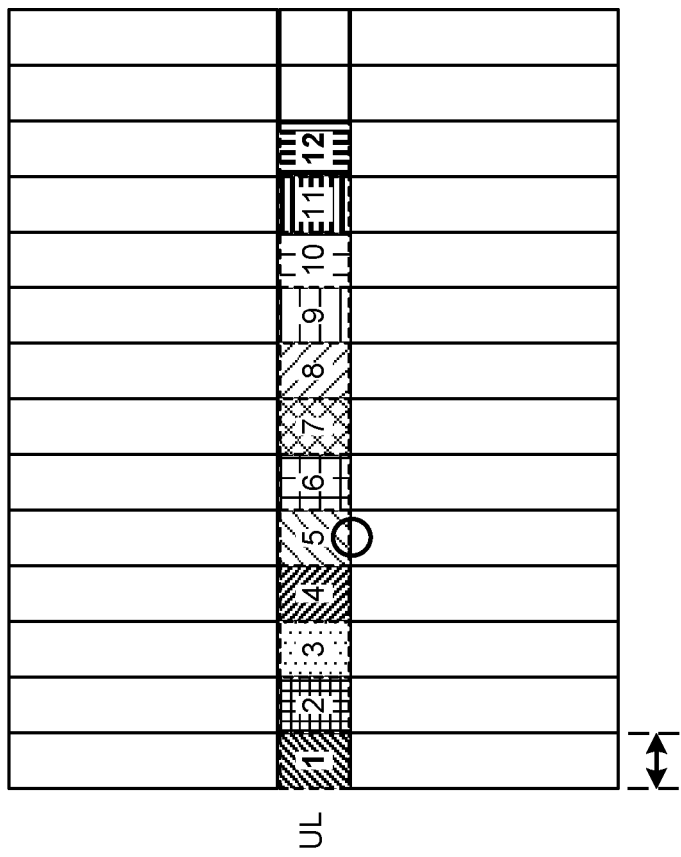
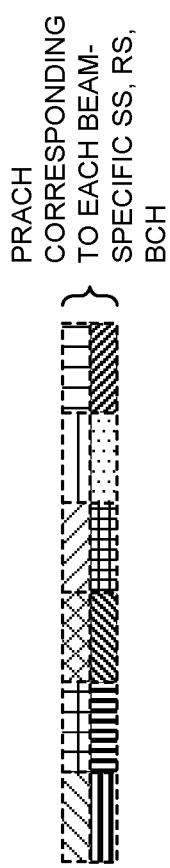
FIG. 6B
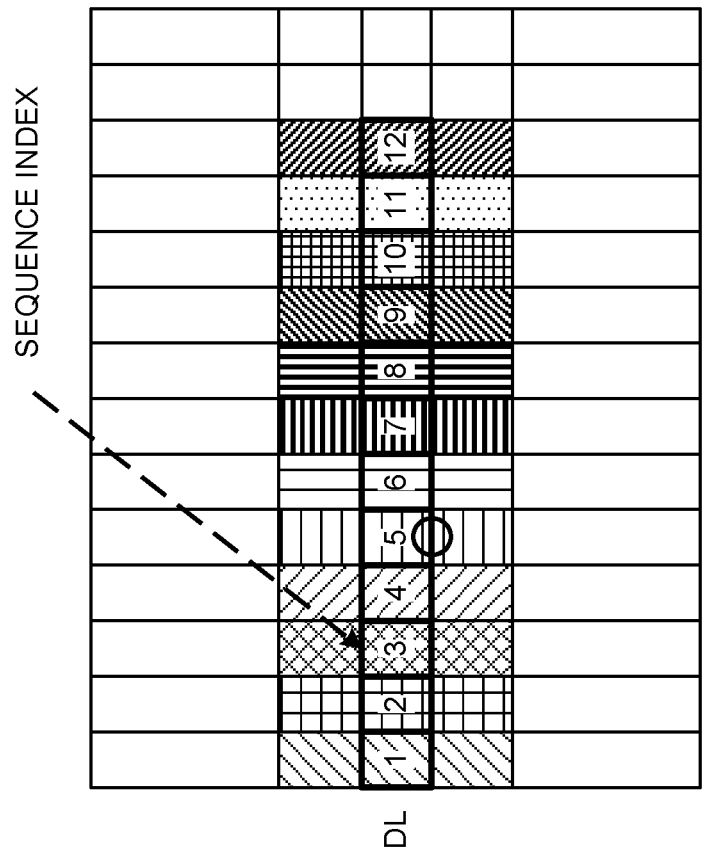
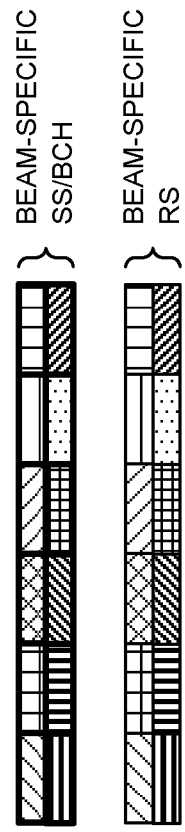

FIG. 7A
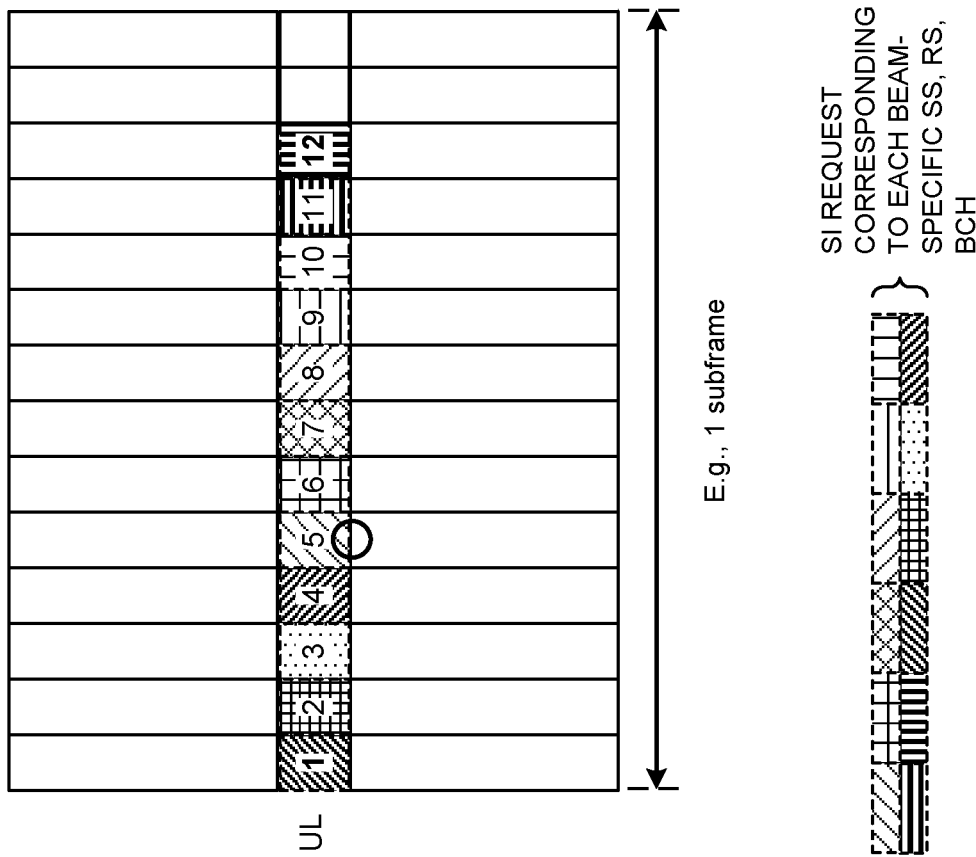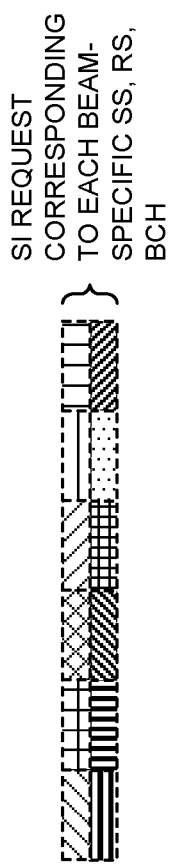
FIG. 7B
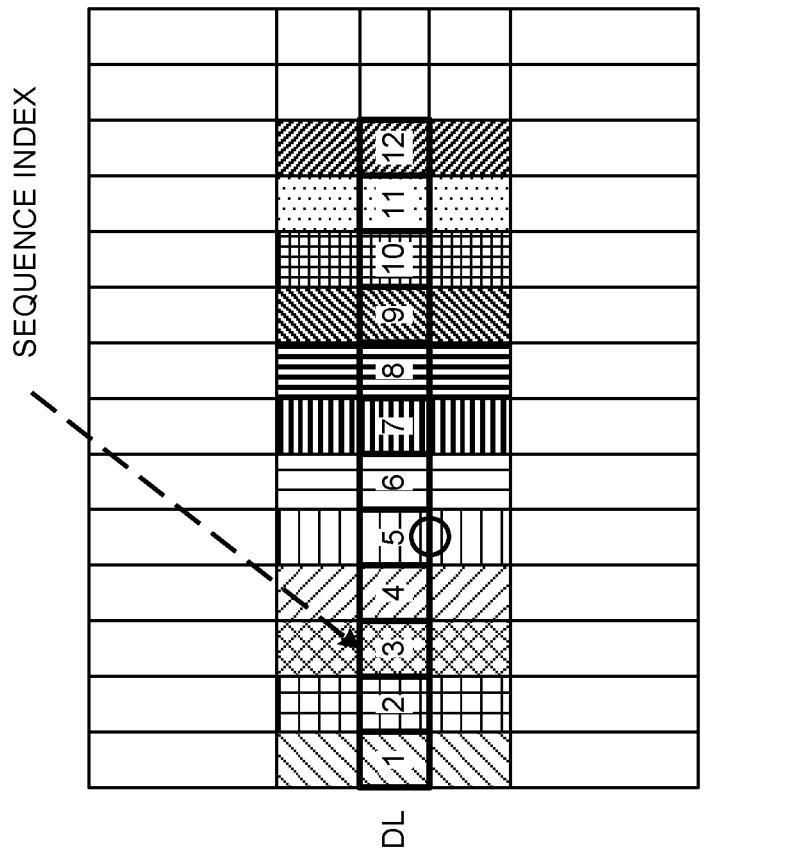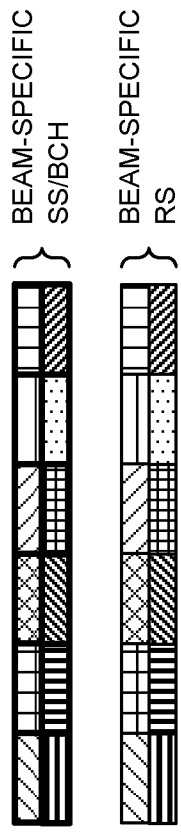

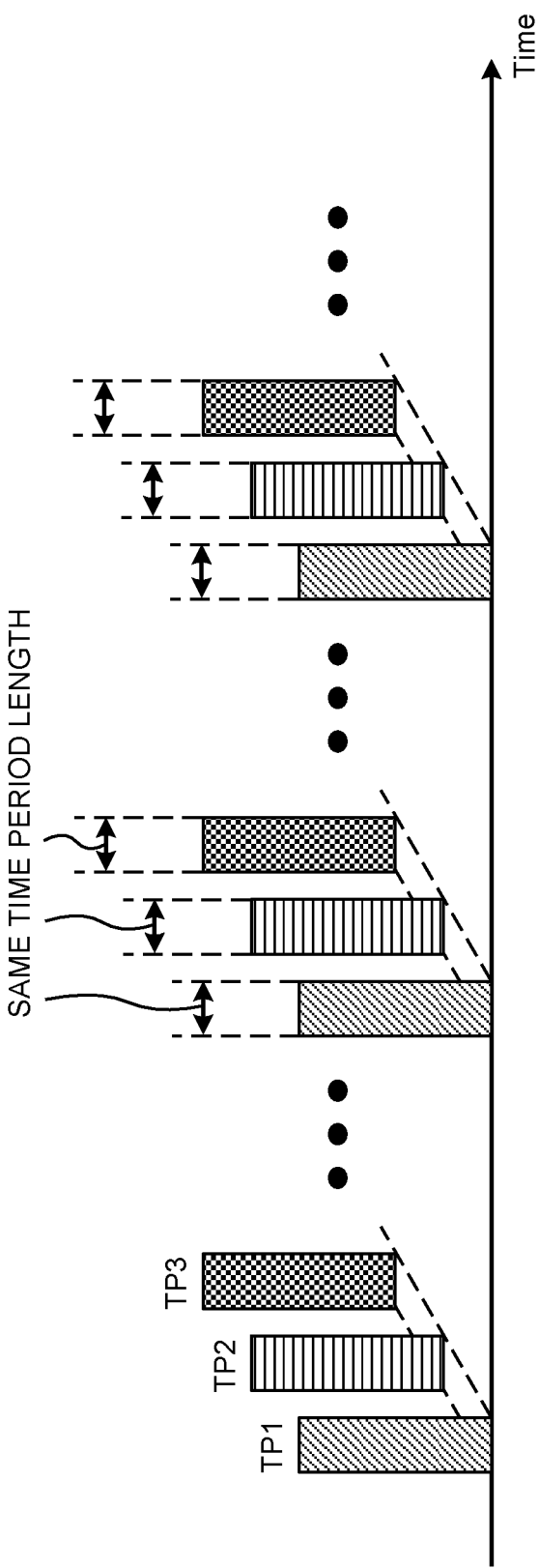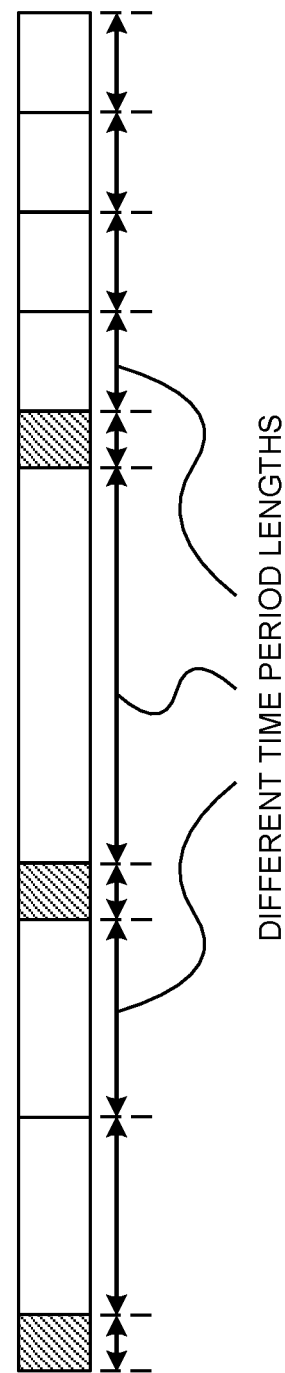

USER TERMINAL, RADIO BASE STATION AND RADIO COMMUNICATION METHOD

TECHNICAL FIELD

The present invention relates to a user terminal, a radio base station and a radio communication method in a next-generation mobile communication system.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11" or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "NR (New Radio)," "NX (New radio access)," "FX (Future generation radio access)," "LTE Rel. 13," "LTE Rel. 14," "LTE Rel. 15" and/or later versions) are under study.

In LTE Rel. 10/11, carrier aggregation (CA) to integrate multiple component carriers (CC) is introduced in order to achieve broadbandization. Each CC is configured with the system bandwidth of LTE Rel. 8 as one unit. In addition, in CA, multiple CCs under the same radio base station (eNB: eNodeB) are configured in a user terminal (UE: User Equipment).

Meanwhile, in LTE Rel. 12, dual connectivity (DC), in which multiple cell groups (CGs) formed by different radio base stations are configured in a UE, is also introduced. Each cell group is comprised of at least one cell (CC). Since multiple CCs of different radio base stations are integrated in DC, DC is also referred to as "inter-eNB CA."

Also, in LTE Rel. 8 to 12, frequency division duplex (FDD), in which downlink (DL) transmission and uplink (UL) transmission are made in different frequency bands, and time division duplex (TDD), in which downlink transmission and uplink transmission are switched over time and made in the same frequency band, are introduced.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

Future radio communication systems (for example, 5G, NR, etc.) are expected to realize various radio communication services so as to fulfill varying requirements (for example, ultra high speed, large capacity, ultra-low latency, etc.).

For example, in 5G, researches have been made to provide radio communication services, referred to as "eMBB (enhanced Mobile Broad Band)," "IoT (Internet of Things)," "MTC (Machine Type Communication)," "M2M (Machine To Machine)," and "URLLC (Ultra Reliable and Low Latency Communications)." Note that M2M may be referred to as "D2D (Device To Device)," "V2V (Vehicle To Vehicle)," and so on, depending on the communication device. To fulfill the requirements for various types of communication such as mentioned above, studies are in progress to design new communication access schemes (new RAT (Radio Access Technology).

In 5G, study is in underway to provide services using a very high carrier frequency of 100 GHz, for example. Generally speaking, it becomes more difficult to secure coverage as the carrier frequency increases. The reasons for this include that the distance-induced attenuation becomes more severe and the rectilinearity of radio waves becomes stronger, the transmission power density decreases because ultra-wideband transmission is performed, and so on.

Therefore, in order to meet the demands of the above-noted various types of communication even in high frequency bands, study is in progress to use massive MIMO (massive MIMO (Multiple Input Multiple Output)), which uses a very large number of antenna elements. When a very large number of antenna elements are used, beams (antenna directivities) can be formed by controlling the amplitude and/or the phase of signals transmitted/received in each element. This process is also referred to as "beamforming (BF)," and makes it possible to reduce the propagation loss of radio waves.

However, when BF is simply applied, all the signals and channels that are transmitted periodically in broadcast transmission in existing LTE systems need to be transmitted multiple times each, by applying different beams, and a problem arises with the growth of communication overhead.

The present invention has been made in view of the above, and it is therefore an object of the present invention to provide a user terminal, a radio base station and a radio communication method, whereby communication overhead can be reduced in communication in which beamforming is used.

Solution to Problem

According to one aspect of the present invention, a user terminal has a transmission section that transmits a beam identification signal for identifying a given beam, a receiving section that receives given information transmitted in the given beam based on the beam identification signal, and a control section that controls transmission of the beam identification signal.

Advantageous Effects of Invention

According to the present invention, it is possible to reduce communication overhead in communication, in which beamforming is used.

BRIEF DESCRIPTION OF DRAWINGS

FIGS. 2A and 2B are diagrams to show examples of frequency resources where beam-specific signals are mapped;

FIGS. 3A and 3B are diagrams to show other examples of frequency resources where beam-specific signals are mapped;

FIGS. 5A and 5B are diagrams to show examples of cases where the sequences of beam-specific signals are determined depending on the positions of symbols;

FIGS. 6A and 6B are diagrams to show examples of associations between beam-specific signals and the PRACH when the PRACH serves as a beam identification signal;

FIGS. 7A and 7B are diagrams to show examples of associations between beam-specific signals and an on-demand information request when the on-demand information serves as a beam identification signal;

FIGS. 9A and 9B are diagrams to show other examples of differences in subframe length between sweep periods and non-sweep periods;

DESCRIPTION OF EMBODIMENTS

Figure 1A:
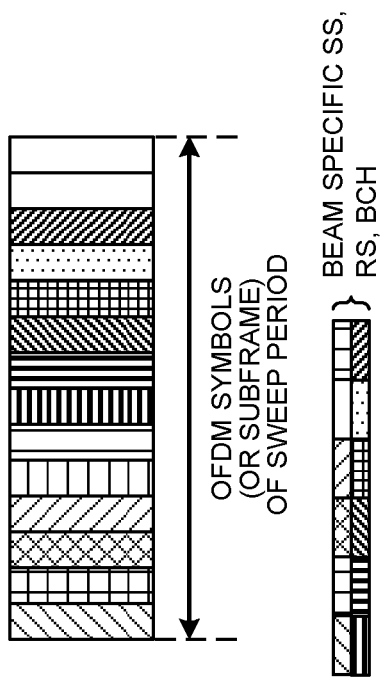
FIGS. 1A to 1D are diagrams to explain the concept of beam-specific signal transmission according to step S1.

BF can be classified into digital BF and analog BF. Digital BF refers to the method of performing precoding signal processing on the baseband (for digital signals). In this case, inverse fast Fourier transform (IFFT)/digital-to-analog conversion (DAC)/RF (Radio Frequency) need to be carried out in parallel processes, as many as the number of antenna ports (RF chains). Meanwhile, it is possible to form a number of beams to match the number of RF chains at an arbitrary timing.

Analog BF refers to the method of using phase shifters on RF. In this case, since it is only necessary to rotate the phase of RF signals, analog BF can be realized with simple and inexpensive configurations, but it is nevertheless not possible to form a plurality of beams at the same time.

To be more specific, when analog BF is used, each phase shifting device can only form one beam at a time. Consequently, if a base station (for example, referred to as an "eNB (evolved Node B)," a "BS (Base Station)," and so on) has only one phase shifting device, only one beam can be formed at a given time. Therefore, when multiple beams are transmitted using analog BF alone, these beams cannot be transmitted simultaneously using the same resources, and the beams need to be switched, rotated and so on, over time.

Note that it is also possible to adopt a hybrid BF configuration, which combines digital BF and analog BF. While a study is on-going to introduce massive MIMO in future radio communication systems (for example, 5G), attempting to form an enormous number of beams with digital BF alone might lead to an expensive circuit structure. For this reason, it is assumed that a hybrid BF configuration will be used in 5G.

Now, in order to enhance coverage by using BF, the base station needs to apply transmitting BF to all the DL signals. Also, the base station needs to apply receiving BF to all the UL signals. This is because, even if BF is applied to only part of the signals, other signals to which BF is not applied cannot communicated properly between the base station and UEs.

In existing LTE systems, the base station needs to transmit, periodically, signals for cell detection (cell search), initial access (for example, synchronization signals (SSs), broadcast channel (BCH), system information (SI), etc.) and so on, regardless of whether UEs are present or not.

To simply realize enhancement of coverage, it may be possible to transmit all of these signals multiple times by applying different BFs (that is, by sweeping). Thereby, a UE can receive signals to beam that are suitable for the UE itself are applied, and, after gaining initial access, communicate with the base station using appropriate beams.

However, in order to cover a wide range, it is necessary to repeat transmitting various signals/channels as many times as the number of beams (the number of beam patterns), which poses a problem of increased overhead.

So, the present inventors have focused on the fact that transmission of SS/BCH can be completed by using resources as little as one symbol, while transmission of SI requires one subframe or so and increases overhead, and found out a signal configuration that has low overhead and allows initial access to be gained as fast as possible.

According to one aspect of the present invention, instead of periodically sweeping and transmitting a relatively large amount of information (for example, SI) to be broadcast or multicast to a large number of UEs, the base station transmits information to a UE on an on-demand basis, when triggered by a request from the UE, by using BF suitable for the UE. As a result of this, it is possible to reduce the amount of signals that are constantly/regularly transmitted (on an always-on basis), and reduce the communication overhead.

Now, embodiments of the present invention will be described in detail below with reference to the accompanying drawings. The radio communication methods according to individual embodiments may be applied individually or may be applied in combination.

In the following description, a relatively large amount of information, to which BF is applied, and which is transmitted on an on-demand basis (triggered by a request from the UE), is also referred to as "on-demand information." For example, the on-demand information may be broadcast information and system information, which are transmitted to all UEs in cells (and which are, for example, transmitted without being masked with the IDs of specific, individual UEs so that any UE can receive these pieces of information), multicast information, which is transmitted to specific UEs (UE group), or other information in existing LTE systems (for example, LTE Rel. 8 to 12). Note that the on-demand information may be at least one of broadcast information, system information, multicast information and other information to be defined in future radio communication systems (for example, 5G, LTE Rel. 13 or later versions).

The on-demand information may be at least one of information that is necessary for communication in a carrier where beams are used (for example, SI), information (for example, multicast information) that is not data (transport blocks (TBs)) for individual UEs and that is directed to specific UEs (UE group), and so on. In the following description, system information (SI) will be primarily assumed as on-demand information, but this is not limiting.

Note that, when, a plurality of beams are different herein, this should be construed to mean that, for example, at least one of following (1) to (6), which are applied to each of these multiple beams, is different, but this is not limiting: (1) the precoding; (2) the transmission power; (3) the phase rotation; (4) the beam width; (5) the beam angle (for example, the tilt angle); and (6) the number of layers. Note that, when the precoding varies, the precoding weight may vary, or the precoding scheme may vary (for example, linear precoding, non-linear precoding and so on). When linear precoding and non-linear precoding are applied to beams, the transmission power, the phase rotation, the number of layers and so on can also vary.

Examples of linear precoding include precoding based on the zero-forcing (ZF) model, precoding based on the regularized zero-forcing (R-ZF) model, precoding based on the minimum mean square error (MMSE) model, and so on. Also, as for examples of non-linear precoding, there are types of precoding, including dirty paper coding (DPC), vector perturbation (VP), Tomlinson-Harashima precoding (THP), and so on. The applicable precoding is not limited to these.

(Radio Communication Method)

According to one embodiment of the present invention, following steps S1 to S3 below, on-demand information is reported to a UE. First, the UE receives a SS/reference signal (RS)/BCH, to which BF is applied, and identifies (selects) an adequate beam (step S1). Next, the UE transmits a signal to the base station that can identify (specify) the selected adequate beam (step S2). Finally, based on the report from the UE, the base station transmits on-demand information, to which appropriate BF is applied (step S3).

Each step will be described in detail below.

<Step S1>

Signals such as SS/RS/BCH, which are used to identify (specify) adequate beams, may be referred to as "beam-specifying signals (beam specifying channels)." The beam specifying signals are configured differently per beam, and therefore may be referred to as "beam-specific signals (beam-specific channels)," and as, for example, "beam-specific SSs (BSSs)"/"beam-specific RSs (BRSs)"/"beam-specific BCHs (BBCHs)."

FIG. 1 provide diagrams to explain concepts of transmission of beam-specific signals in step S1. Here, FIG. 1A shows an example in which three transmission points (TPs) transmit beam-specific signals to a UE.

Figure 1B:
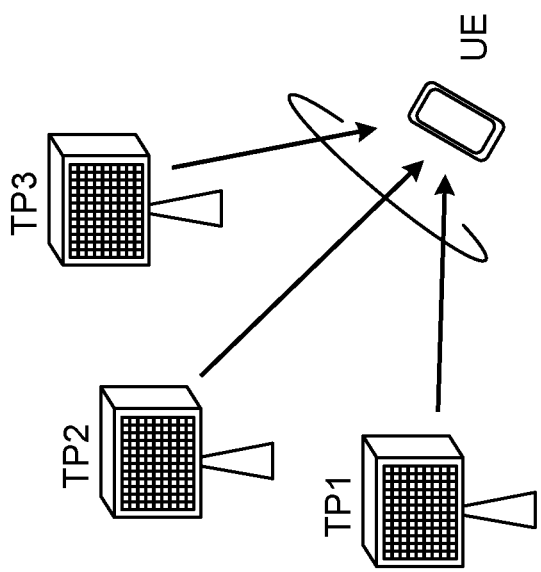

As shown in FIG. 1B, each TP (TP1 to TP3) transmits a group of beam-specific signals in a time period, which is provided periodically. This time period may be referred to as "sweep time," "sweep period," and so on. For example, a sweep period may be one subframe, or may be another unit of time (for example, one or more symbols (for example, OFDM (Orthogonal Frequency Division Multiplexing) symbols)). A sweep period may include a period in which no beam is transmitted (and which may be referred to as a "no-transmission period," a "guard period," etc.). Each TP can practice flexible scheduling at times other than sweep periods.

Figure 1C:
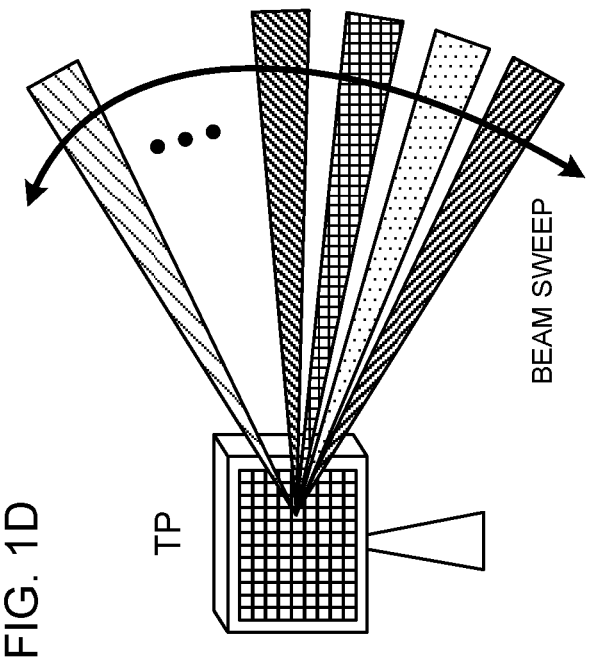
Figure 1D:
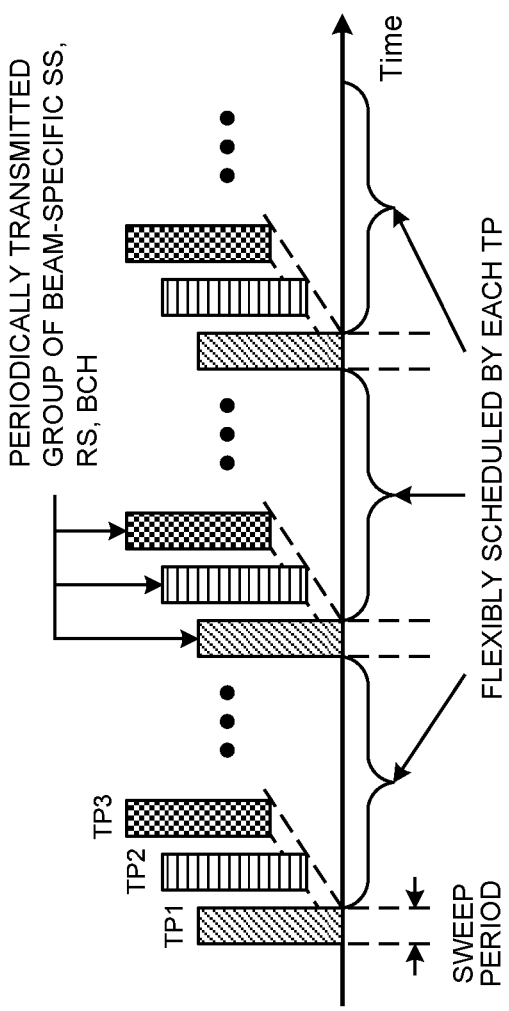

FIG. 1C is a diagram to show examples of beam-specific signals that are transmitted in a sweep period, and FIG. 1D is a diagram to show examples of beams corresponding to each beam-specific signal of FIG. 1C. In a sweep period, each TP transmits beam-specific signals while sweeping beams. As shown in FIG. 1C, in a sweep period, a different beam-specific signal is transmitted in every predetermined period (for example, one symbol). As shown in FIG. 1D, if beams vary, the beam-specific signals to be transmitted also vary. In this way, step S1 can be implemented even when analog BF is used, by adopting a configuration which time-division-multiplexes (TDM) varying beam-specific signals.

Note that the symbol period may be represented, for example, in units of OFDM/SC-FDMA (Single Carrier Frequency Division Multiple Access) symbols, in units of the reciprocal of a predetermined bandwidth (that is, sampling duration), or in other units.

In order to facilitate initial access and/or cell detection, mapping of beam-specific SSs/BCHs may be limited to specific frequency resources. For example, SSs/BCHs may be transmitted only in predetermined frequency resources (for example, six PRBs (=72 subcarriers)) at the center of the system band. Additional RSs may be mapped to frequency resources apart from the SSs/BCHs in order to increase the accuracy of detection and/or reduce the time required for detection.

Note that the RSs may include an RS for channel measurement (for example, channel state information reference signal (CSI-RS)), a downlink sounding reference signal (DL-SRS), or RSs that are set forth apart from these (for example, a BRS).

FIG. 2 are diagrams to show examples of frequency resources where beam-specific signals are mapped. The additional RSs described above may be mapped to multiple resources that are symmetric with respect to the center frequency (or the SS/BCH) (FIG. 2A), or may be mapped unevenly to either a higher or a lower frequency with respect to the center frequency (or the SS/BCH) (FIG. 2B). By allowing RSs to be provided in an un-uniform manner, it is possible to reserve a wide range of higher or lower frequency resources with respect to the center frequency, so that, in the future, it is possible to define/map wideband signals.

FIG. 3 are diagrams to show other examples of the frequency resources where beam-specific signals are mapped. The additional RSs described above may be spread throughout the system band in the same symbols as the SS/BCH (FIG. 3A). In this case, a sufficient amount of radio resources are used as RSs, so that the accuracy of beam detection can be improved.

Meanwhile, the above-described additional RSs may be mapped to resources that are not continuous with the SS/BCH in the frequency domain (FIG. 3B). In FIG. 3B, additional RSs are mapped to both ends of the system band. In this case, it is possible to reserve blank radio resources while improving the accuracy of beam detection by achieving a frequency diversity effect, thus improving scalability for the future.

Also, in a sweep period, signals other than beam-specific signals may be transmitted. For example, in a resource where no beam-specific signal is mapped, at least one of a data signal, a control signal and a reference signal may be transmitted.

Note that, given a plurality of mapping patterns such as those shown in FIG. 2 and FIG. 3, a UE may detect beam-specific signals on a blind basis. For example, the UE may detect beam-specific signals on a blind basis assuming each mapping pattern of FIG. 2A and FIG. 2B.

Also information about the mapping pattern, based on which beam-specific signals are to be detected, is reported (configured) to the UE by higher layer signaling (for example, RRC (Radio Resource Control) signaling, broadcast information (the MIB (Master Information Block), SIBs (System Information Blocks), etc.), physical layer signaling (for example, downlink control information (DCI)), or a combination of these, and the UE may detect beam-specific signals based on this information.

A TP can hop the order of beams to transmit in a TP-specific pattern or in a cell-specific pattern, or randomly. For example, given beam-specific signals that are transmitted in a predetermined cycle, the order (pattern) of beam sweeping may be changed every time transmission is performed or every time transmissions is performed a number of times. This prevents an SS/BCH to which a specific beam is applied from constantly interfering with an SS/BCH to which a specific beam for another TP/cell is applied, so that the rate of beam detection can be improved. Also, when the order (pattern) of beam sweeping is changed every time transmission is performed a number of times, the UE can synthesize and receive multiple transmissions without changing the beam sweeping order (pattern), so that the accuracy of beam detection can be improved.

Figure 4:
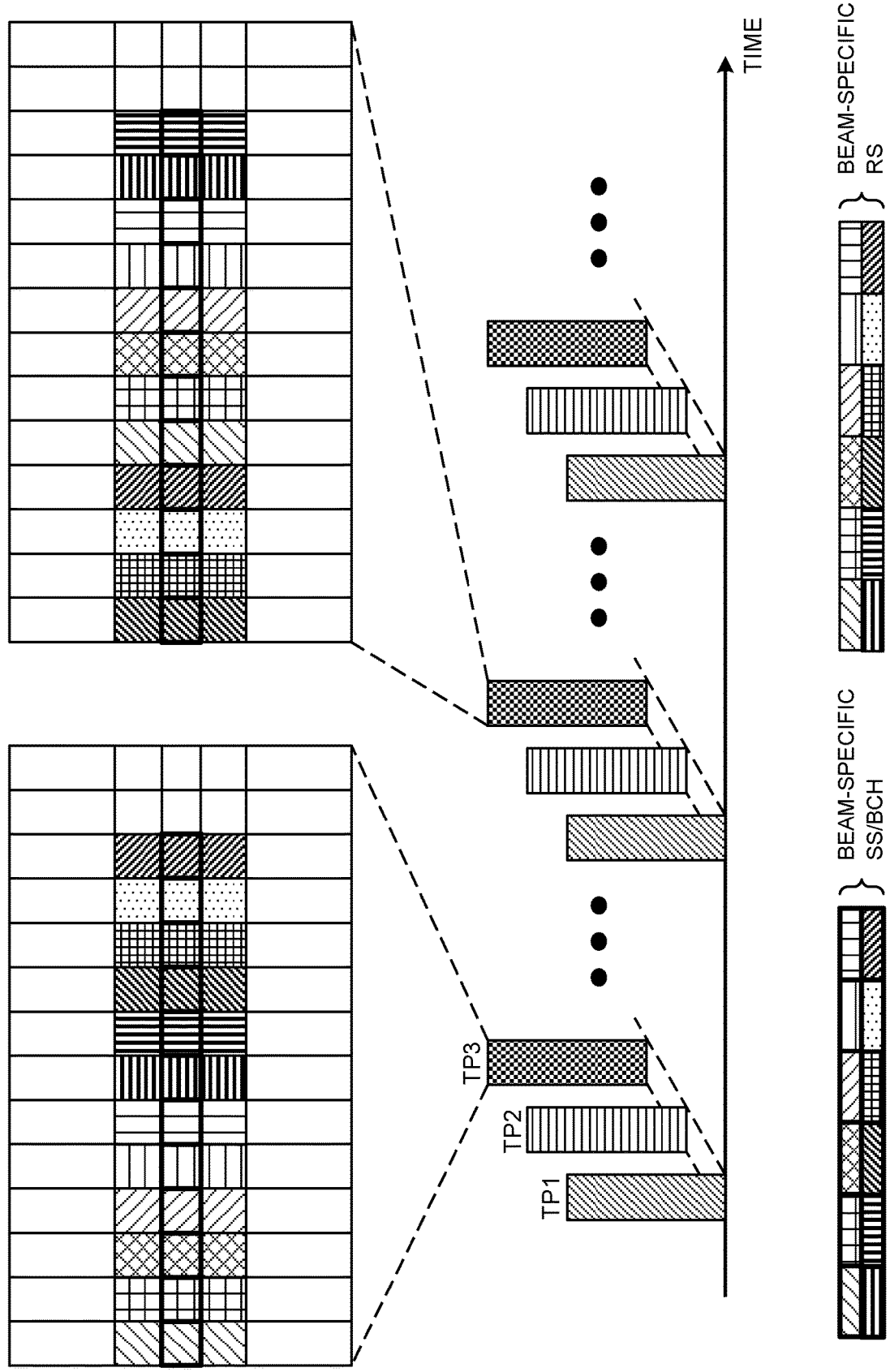
FIG. 4 is a diagram to show an example in which the beam sweep transmission pattern is switched.

FIG. 4 is a diagram to show an example of changing the beam sweep transmission pattern. The transmission pattern in the second sweep period for TP 3 shown in the drawing is an equivalent of the transmission pattern in the first sweep period being, cyclically shifted through eight symbols. In this way, the transmission pattern may be cyclically shifted in time, for every sweep period or for every several sweep periods, in TP-specific patterns or in cell-specific patterns, or randomly.

A beam-specific signal (SS/RS/BCH) that is transmitted in a predetermined cycle may be configured so that at least one of the sequence, the waveform and the frequency resource varies depending on where in a sweep period the beam-specific signal is transmitted (for example, the symbol position). To be more specific, at least one of the sequence, the waveform and the frequency resource may be associated with symbol positions in a sweep period on a one-by-one basis.

In this case, regardless of the sweep order (pattern) of beams, the sequence, waveform, and so on can be determined based on the position of the symbol, so that, by detecting the beam-specific signal, the UE can identify the symbol position and/or the starting timing of the subframe. Also, even if the UE does not know which beam is detected (for example, which precoding is applied to the beam), the UE has only to report in which symbol the beam-specific signal has been detected, and the base station can properly identify the beam detected by the UE.

The sequence may be, for example, a Zadoff-Chu sequence or another sequence. Also, depending on the position of the symbol, the scrambling sequence to be multiplied upon the sequence and/or the cyclic shift to be applied to the sequence may be changed. As for the components of the waveform, the transmission power may be changed depending on the position of the symbol. Further, as for frequency resources, the positions of frequency resources and/or the width of frequency resource (for example, the number of PRBs) may be changed depending on the position of the symbol.

Note that, a configuration in which all of the SS, the RS, and the BCH vary depending on the position of the symbol may be adopted, or a configuration may be adopted in which at least a part of these varies depending on the position of the symbol.

Also, the UE may determine the beam identification information (for example, the beam index) corresponding to a beam-specific signal based on the beam-specific signal. For example, when beam identification information is included in the BCH, the UE may acquire the beam identification information from the BCH.

FIG. 5 are diagrams to show examples of cases where sequences of beam-specific signals are determined depending on symbol positions. FIG. 5 show sequence indices that correspond to individual symbol positions. In this example, the first symbol in the sweep period corresponds to the sequence of sequence index 1, and the sequence index is incremented with the passage of symbols. In the transmission pattern of FIG. 5A and the transmission pattern of FIG. 5B, different beams (for example, beams to which different precoding are applied) are transmitted at the same symbol position, but the same sequence is used in the same symbol position.

Based on the detected beam-specific signals, the UE selects beams that adequate for the UE itself. For example, the UE may judge that a beam-specific signal exceeding predetermined received quality corresponds to a beam adequate for the UE itself.

As explained above, in step S1, the base station transmits beams using a signal configuration including at least one of an SS, an RS and a BCH, so that the UE can easily obtain information related to beams that are adequate for the UE itself.

<Step S2>

The UE needs to report information related to adequate beams acquired in step S1 (information for identifying the beam) to the base station. The present inventors have focused on the fact that, when step S1 is complete, the UE has not received SI yet and RRC connection is not established yet either, and that the UE therefore cannot perform UL transmission using control channels and/or data channels which become available after RRC connection is established.

So, the present inventors have come up with the idea of transmitting UL signals that are associated with beams, in step S2. Since the base station can use these UL signals to identify beams, these UL signals may be referred to as, for example, "beam identification signals," "UL signals for beam identification," and so on.

A channel for initial access (for example, a random access channel (PRACH: Physical Random Access Channel)) can be used to transmit beam identification signals. Also, to transmit beam identification signals, a request signal for requesting on-demand information (which may be referred to as, for example, "on-demand information request")) may be used. Each of these will be described in detail below.

[When PRACH is Beam Identification Signal]

Assume that the UE knows the associations among beam identification information (for example, beam indices), at least one of the sequences, waveforms and frequency resources of beam-specific signals (for example, sequence indices such as those shown in FIG. 5) or symbol numbers, and PRACH transmission sequences and/or resources. These associations may be defined in advance in the specification. Also, information about these the associations may be reported (configured) in the UE using higher layer signaling (for example, broadcast information), physical layer signaling, or a combination of these.

In accordance with the beam-specific signal (for example, the SS/BCH) which the UE itself detected or judged adequate in step S1, the UE selects a sequence and/or a resource for the PRACH with reference to the above associations, and transmits the PRACH. That is, this PRACH is associated with at least one beam (beam-specific signal) received by the UE.

The base station that detects the PRACH determines that a beam that is suitable for a predetermined UE is present, based on the PRACH sequence and/or resource detected, and transmits on-demand information (for example, SI) by using this beam. This transmission of on-demand information will be described in detail in step S3. In this way, in step S2, the PRACH is used to request on-demand information, and therefore the PRACH may be referred to as an "on-demand information request signal."

Note that the above PRACH transmission may take place during normal random access procedures. In this case, the UE receives on-demand information during random access procedures. Also, apart from random access procedures, the UE may transmit the PRACH for the purpose of receiving on-demand information. In this case, even if the UE has no data to transmit in the UL, the UE can transmit the PRACH in order to receive on-demand information at an arbitrary timing.

FIG. 6 provide diagrams to show examples of associations between beam-specific signals and the PRACHs when the PRACH serves as a beam identification signal. Although FIG. 6A shows an example that is similar to FIG. 5A, here, it is assumed that the UE has detected the beam-specific signal of sequence index 5 (shown with a circle in FIG. 6A).

FIG. 6B shows an example of PRACH resources corresponding to (the sequence index of) each beam-specific signal in FIG. 6A. Here, an example is shown in which all the PRACH resources corresponding to (the sequence index of) each beam-specific signal are mapped near the center frequency, the PRACH resources are not limited to these. Also, the PRACH resources may be mapped to different frequency resources depending on (the sequence indices of) corresponding beam-specific signals.

Also, each PRACH resource may have a predetermined time duration (for example, one subframe). The UE transmits different PRACH sequences/resources depending on which SS/BCH in FIG. 6A is detected, or depending on which SS/BCH is judged adequate (for example, the best). In this example, the UE transmits the PRACH using the PRACH resource corresponding to sequence index 5 that is detected (shown with a circle in FIG. 6B). If the UE successfully detects multiple SSs/BCHs, the UE may transmit multiple PRACHs in multiple resources.

Note that, although FIG. 6B shows an example in which the time resource for the PRACH varies depending on which beam-specific signal is detected, this is by no means limiting. For example, a configuration may be employed here in which the frequency resource of the PRACH varies depending on the beam-specific signal detected, or a configuration may be used in which the PRACH sequence varies.

[When on Demand Information Request is Beam Identification Signal]

An on-demand information request may be transmitted using a predetermined UL channel or signal. The on-demand information request may request a single kind of on-demand information, or request multiple kinds of on-demand information. For example, an on-demand information request to request SI may be referred to as an "SI request." Furthermore, an on-demand information request to request multicast information may be referred to as a "multicast information request."

An on-demand information request may be defined as, for example, a predetermined sequence. Assume that the UE knows the associations among beam identification information (for example, beam indices), at least one of the sequences, waveforms and frequency resources of beam-specific signals (for example, sequence indices such as those shown in FIG. 5) or symbol numbers, and on-demand information request transmission sequences and/or resources. These associations may be defined in advance in the specification. Also, information about these associations may be reported (configured) in the UE using higher layer signaling (for example, broadcast information), physical layer signaling, or a combination of these.

In accordance with the beam-specific signal (for example, the SS/BCH) which the UE itself detected or judged adequate in step S1, the UE selects a sequence and/or a resource for an on-demand information request with reference to the above associations, and transmits an on-demand information request. That is, this on-demand information request is associated with at least one beam (beam-specific signal) received by the UE. Note that the UE may exert control so that an on-demand information request is transmitted when predetermined on-demand information is not received in the beam corresponding to the beam-specific signal which the UE has detected and/or judged adequate.

In this case, the base station that receives the on-demand information request determines that a beam that is suitable for a predetermined UE is present, based on the on-demand information request sequence and/or resource received, and transmits the on-demanded information (for example, SI) that is requested.

Also, an on-demand information request may be defined as a predetermined message. In this case, assume that the UE knows which resources can be used to transmit this message. For example, these resources may be prescribed in advance in the specification. Also, information about these resources may be reported (configured) to the UE by higher layer signaling (for example, broadcast information), physical layer signaling, or a combination of these.

The UE includes either beam identification information (for example, the beam index) of the beam-specific signal (for example, the SS/BCH) which the UE itself detected or judged adequate in step S1, or information about at least one of the sequence, waveform and frequency resource of the beam-specific signal (example, sequence index) or the symbol number, or a combination of these, in an on-demand information request and transmits this in a predetermined resource.

In this case, the base station that receives the on-demand information request judges that a beam that is suitable for a predetermined UE is present, based on the information included in the received on-demand information request, and transmits the requested on-demand information (for example, SI) is transmitted using this beam.

FIG. 7 provide diagrams to show examples of associations between beam-specific signals and on-demand information requests where on-demand information requests serve as beam identification signals. Although FIG. 7A shows an example similar to FIG. 5A, it is assumed here that the UE has detected the beam-specific signal of sequence index 5 (shown with a circle in FIG. 7A).

FIG. 7B shows examples of resources for on-demand information requests corresponding to (the sequence index of) each beam-specific signal of FIG. 7A. Each on-demand information request resource may correspond to a predetermined time duration (for example, one symbol). The resources for on-demand information requests may be configured to have a time duration shorter than the time duration of PRACH resources (for example, one subframe), for example. Furthermore, it is preferable that all the on-demand information request resources are included in a predetermined period (for example, one subframe).

The UE transmits different on-demand information request sequences/resources depending on which SS/BCH in FIG. 7A is detected, or depending on which SS/BCH is judged adequate (for example, the best). In this example, the UE transmits an on-demand information request using the detected on-demand information request transmission resource corresponding to sequence index 5 (shown with a circle in FIG. 7B).

Note that, although FIG. 7B shows an example in which the time resource for an on-demand information request varies depending on which beam-specific signal is detected, but this is by no means limiting. For example, a configuration may be employed here in which the frequency resource of an on-demand information request varies depending on the beam-specific signal detected, or a configuration may be used in which the sequence of an on-demand information request varies.

As explained above, in step S2, the base station can determine, based on UL signals transmitted from a UE, that at least one beam transmitted from the base station itself is suitable for communication with the UE.

Note that, in step S2, if the UE detects multiple beam-specific signals or judges multiple beams-specific signals adequate, the UE may transmit UL signals (PRACH and/or on-demand information request) corresponding to each beam-specific signal, or, if a sequence and/or a resource that can specify a plurality of beam-specific signals provided in the above associations, the UE may transmit one applicable UL signal.

<Step S3>

In step S3, based on the beam identification signal transmitted in step S2, the base station transmits on-demand information using a predetermined beam. Here, the on-demand information may be beam-specific on-demand information, or may be UE-specific on-demand information. For example, when a plurality of UEs transmit beam identification signals that correspond to the same beam, it is preferable to transmit beam-specific on-demand information.

[Control of Transmission/Receipt of Beam-Specific On-Demand Information]

The base station transmits beam-specific on-demand information in a data channel (data CH). The information (for example, resource information) that is necessary to receive the beam-specific on-demand information transmitted in the data CH is indicated to the UE in an L1/L2 control CH. These data CH and L1/L2 control CH are beam-specific signals transmitted in the same beam.

For example, the base station can generate beam-specific signals by masking the cyclic redundancy check (CRC) bits applied (attached) to these data CH and L1/L2 control CH with beam identification information (for example, beam indices).

Note that, instead of the beam identification information or in addition to the beam identification information, the UE may judge what masking is applied to the beam-specific signal based on at least one of the sequence, the waveform and the frequency resource (for example, the sequence index), or the symbol number, of the beam-specific signal that was detected or judged adequate in step S2.

After transmitting the beam identification signal in step S2, the UE attempts to receive the L1/L2 control CH, which schedules beam-specific on-demand information, for a predetermined period. For example, the UE attempts to blind-decode the L1/L2 control CH using the beam identification information. Note that the L1/L2 control CH, which specifies information about the data CH for transmitting beam-specific on-demand information, may be transmitted and received in different time periods than the data CH. For example, this L1/L2 control CH may be transmitted and received in periods in which beam-specific signals are swept, and the corresponding data CH may be transmitted and received in non-sweep time periods. In this case, the UE may blind-decode the L1/L2 control CH only in predetermined, limited time periods, so that the UE can save battery consumption.

[Control of Transmission/Receipt of UE-Specific On-Demand Information]

The base station transmits UE-specific on-demand information in a data channel (data CH). Information (for example, resource information) that is necessary to receive the UE-specific on-demand information transmitted in the data CH is indicated to the UE through an L1/L2 control CH. These data CH and L1/L2 control CH are equivalent to UE-specific signals that are transmitted to the same UE.

For example, the base station can generate UE-specific signals by masking the CRC bits applied (attached) to these data CH and L1/L2 control CH with UE identification information (for example, UEIDs (User Equipment IDs), C-RNTIs (Cell-Radio Network Temporary Identifiers) and so on).

After transmitting the beam identification signal in step S2, the UE attempts to receive the L1/L2 control CH, which schedules UE-specific on-demand information, for a predetermined period. For example, the UE attempts to blind-decode the L1/L2 control CH using the UE identification information. Note that the L1/L2 control CH, which specifies information about the data CH for transmitting UE-specific on-demand information may be transmitted and received in different time periods than the data CH. For example, this L1/L2 control CH may be transmitted and received in periods in which beam-specific signals are swept, and the corresponding data CH may be transmitted and received in non-sweep time periods. In this case, the UE may blind-decode the L1/L2 control CH only in predetermined, limited time periods, so that the UE can save battery consumption.

As explained above, in step S3, the base station and the UE can control transmission/receipt of on-demand information using appropriate beams.

(Variations)

Although examples have been illustrated above with steps S1 to S3 where information that is necessary (for example, SI) for communicating in a carrier (first carrier) that communicates using beams is reported in the same carrier, this is not limiting. For example, when CA or DC is configured in a UE, there is another connecting carrier ("second carrier," "assisting-carrier," etc.), so that the UE can report information that is equivalent to the SI of the first carrier, by using the second carrier.

For example, steps S2 and S3 can be replaced with following steps S4 and S5, respectively. In step S4, the UE reports information about beams/beam-specific signals that are detected and/or judged adequate in step S1, to the base station by using another already-connected carrier. This report may be included in a part of a CSI report and transmitted in an uplink control channel (UL-CCH: Uplink Control Channel), or may be included in a part of a measurement report of an RRM (Radio Resource Management) measurement result, and transmitted in an uplink shared channel (UL-SCH).

In step S5, by using the above different carrier that is already connected, the base station transmits information (for example, SI) that is necessary for communicating in the carrier that uses beams, information for specific UEs (UE group) (for example, multicast information) and so on, to the UE. Note that, the base station may consider an UL signal received in step S4 as an on-demand information request and perform step S3.

The above-described sweep periods for transmitting beam-specific signals may be referred to as time periods (for example, subframes) where SS/RS/BCH are configured regardless of whether or not there is UE data. Also, time periods other than sweep periods (which may be referred to as "non-sweep periods") may be referred to as time periods where on-demand information and/or individual UEs' data are scheduled.

Also, the time-length of control units (for example, subframes, transmission time intervals (TTIs), etc.) in sweep periods may be different from the time-length of at least one of control CHs, data CHs and control units in non-sweep periods.

Figure 8A:
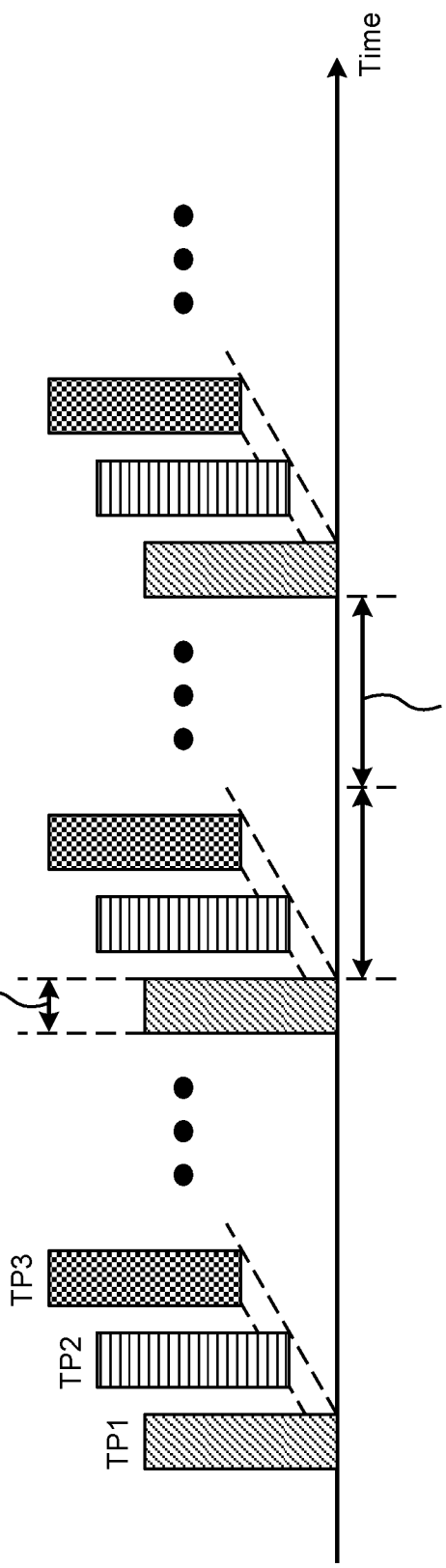
FIGS. 8A and 8B are diagrams to show examples of differences in subframe length between sweep periods and non-sweep periods.
Figure 8B:
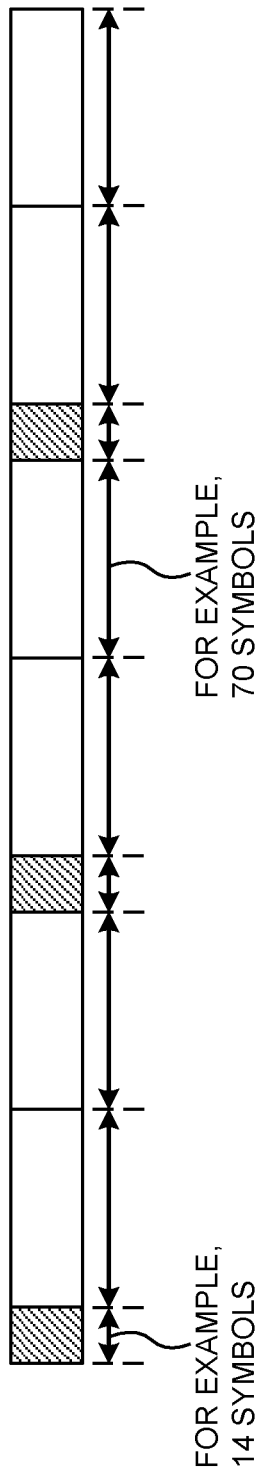

FIG. 8 are diagrams to show an example where the length of subframes varies between sweep periods and non-sweep periods. FIG. 8A shows a similar diagram to FIG. 1B, and illustrates an example in which three TPs (TP 1, TP 2 and TP 3) transmit beam-specific signals in periodically-configured sweep periods. FIG. 8B is a diagram to show examples of subframe configurations used by TP 1 of FIG. 8A.

As shown in FIG. 8B, TP 1 can make the subframe length of fixed resources (of fixed length) for transmitting beam-specific signals (for example, SS/RS/BCH), for example, fourteen symbols. Furthermore, TP 1 can make the subframe length of dynamic resources (of variable length) for transmitting signals/channels that are transmitted on an on-demand basis (for example, system information, multicast information, etc.) and individual UEs' data (unicast data), for example, seventy symbols. The numbers of symbols shown in FIG. 8 are examples, and these values are by no means limiting.

Thus, for example, by configuring the subframe length to constitute non-sweep periods longer than the subframe length to constitute sweep periods, the communication overhead associated with control signals in non-sweep periods can be reduced, and the spectral efficiency can be increased.

FIG. 9 are diagrams to show another example where the length of subframes varies between sweep periods and non-sweep periods. Although FIG. 9A shows a similar example to FIG. 1B, the assumption is that the numerology to use for communication in sweep periods varies per TP. Here, a "numerology" refers to a set of communication parameters that characterize the design of signals in a given RAT, or the design of the RAT, and so on. FIG. 9B is a diagram to show examples of subframe configurations used by TP 1 of FIG. 9A.

As shown in FIG. 9A, the length of subframes and/or the duration of TTIs in sweep periods may be the same regardless of the numerology used for communication. For example, the subframe length and/or the TTI duration in sweep periods may be a time period of the same length, regardless of the radio parameters (for example, the subcarrier spacing, the cyclic prefix (CP) duration, the symbol duration, etc.) and the waveform of OFDM signals.

On the other hand, as shown in FIG. 9B, the subframe length and/or the TTI duration in non-sweep periods may vary depending on on-demand information/numerology configured for transmitting/receiving UE-specific data, or may be configured/specified per UE and/or per time period (control unit time) by using high layer signaling (for example, RRC signaling, broadcast information), physical layer signaling or a combination of these.

In FIG. 9B, a time duration that is half of a non-sweep period, a time duration that is the same as a non-sweep period, and a time duration that is a quarter of a non-sweep period, are shown as subframe lengths in non-sweep periods. Note that a configuration may be adopted here in which various subframe lengths are used within a non-sweep period.

Based on the assumption that the subframe length and/or the TTI duration in sweep periods are the same (constant) regardless of the numerology used for communication, the UE attempts receiving processes (for example, receipt, detection, demapping, decoding, etc.) for the SS/RS/BCH of the carrier that communicates using beams. Note that the UE may attempt receiving processes based on the assumption that the number of symbols included in the same time period (for example, a subframe) varies depending on the subcarrier spacing when performing receiving processes.

Also, the UE may exert control so that on-demand information and/or UE-specific data are transmitted and/or received, regardless of the subframe length and/or the TTI duration in sweep periods, by using higher layer signaling (for example, RRC signaling, broadcast information), physical layer signaling or a combination of these, based on radio parameters (for example, subcarrier spacing, CP duration, etc.) that are configured/specified per UE and/or per time period. The UE may execute control so that on-demand information and/or UE-specific data are transmitted and/or received based on at least one of the subframe length, the TTI duration and the radio parameters configured by using higher layer signaling, physical layer signaling or a combination of these.

Note that, in each of the above embodiments, the BCH (MIB) has been described as being transmitted as beam-specific information that is swept and transmitted in different beams periodically, but this is by no means limiting. For example, the MIB may be included in on-demand information and transmitted, and, in this case, the BCH needs not be swept and transmitted.

(Radio Communication System)

Now, the structure of the radio communication system according to one embodiment of the present invention will be described below. In this radio communication system, communication is performed using one or a combination of the radio communication methods according to the herein-contained embodiments of the present invention.

Figure 10:
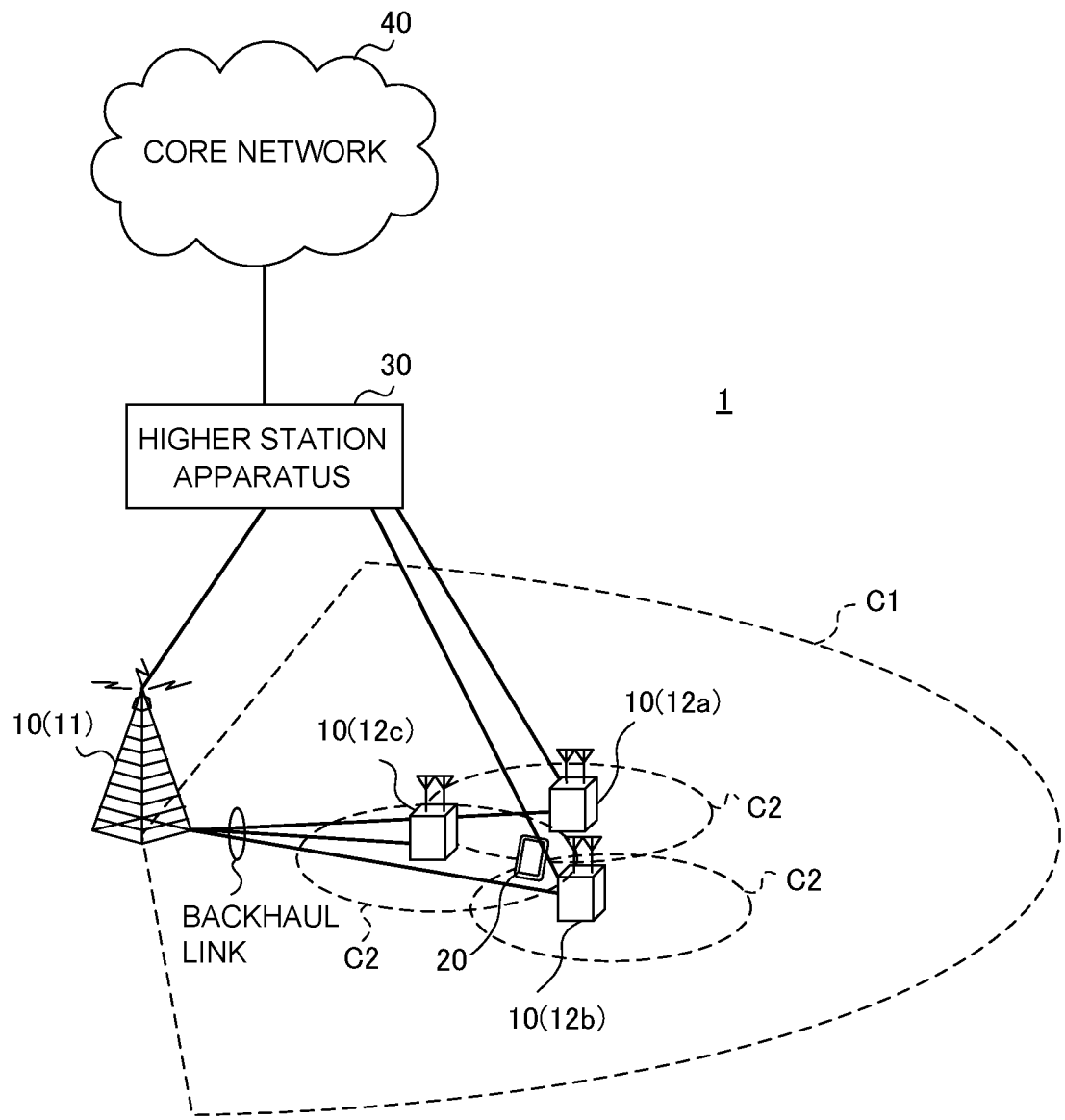
FIG. 10 is a diagram to show an example of a schematic structure of a radio communication system according to one embodiment of the present invention.

FIG. 10 is a diagram to show an example of a schematic structure of a radio communication system according to an embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and other radio access schemes may be used.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACK," "ACK/NACK," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Also, downlink radio quality information (CQI: Channel Quality Indicator), delivery acknowledgement information and so on are communicated by the PUCCH. By means of the PRACH, random access preambles for establishing connections with cells are communicated.

In the radio communication systems 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs: Sounding Reference Signals), demodulation reference signals (DMRSs) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 11:
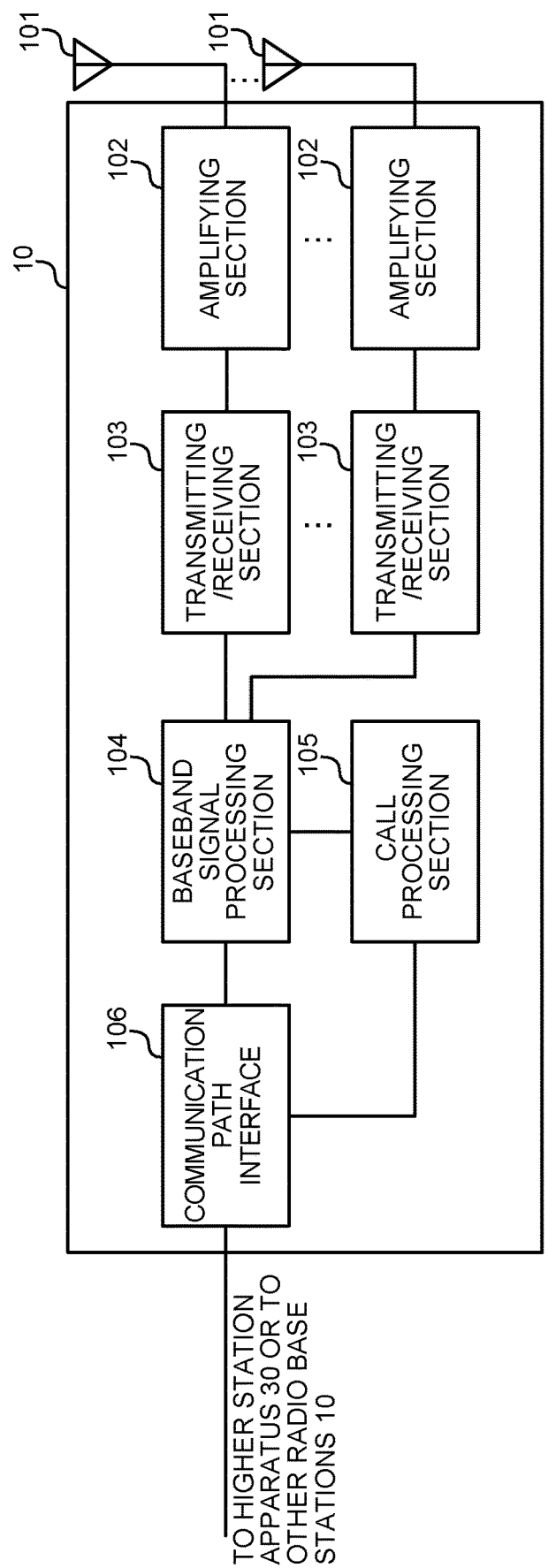
FIG. 11 is a diagram to show an example of an overall structure of a radio base station according to one embodiment of the present invention.

FIG. 11 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 may furthermore have an analog beamforming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 101 may be constituted by, for example, array antennas.

The transmitting/receiving sections 103 transmit beam-specific signals and/or beam-specific channels to user terminals 20. Furthermore, the transmitting/receiving sections 103 may transmit on-demand information to the user terminals 20 in response to beam identification signals (on-demand information request signals). The transmitting/receiving sections 103 may receive beam identification signals (on-demand information request signals) from the user terminals 20.

Furthermore, the transmitting/receiving sections 103 may transmit information about mapping patterns in which beam-specific signals are to be detected, information about the associations between beam identification signals (for example, sequences and/or resources of beam identification signals) and beam-specific signals (for example, the sequence indices of beam-specific signals, the symbol numbers where beam-specific signals are received, beam identification information of beams where beam-specific signals are transmitted, etc.), information about the transmission resource of on-demand information requests and so on, to the user terminals 20.

Figure 12:
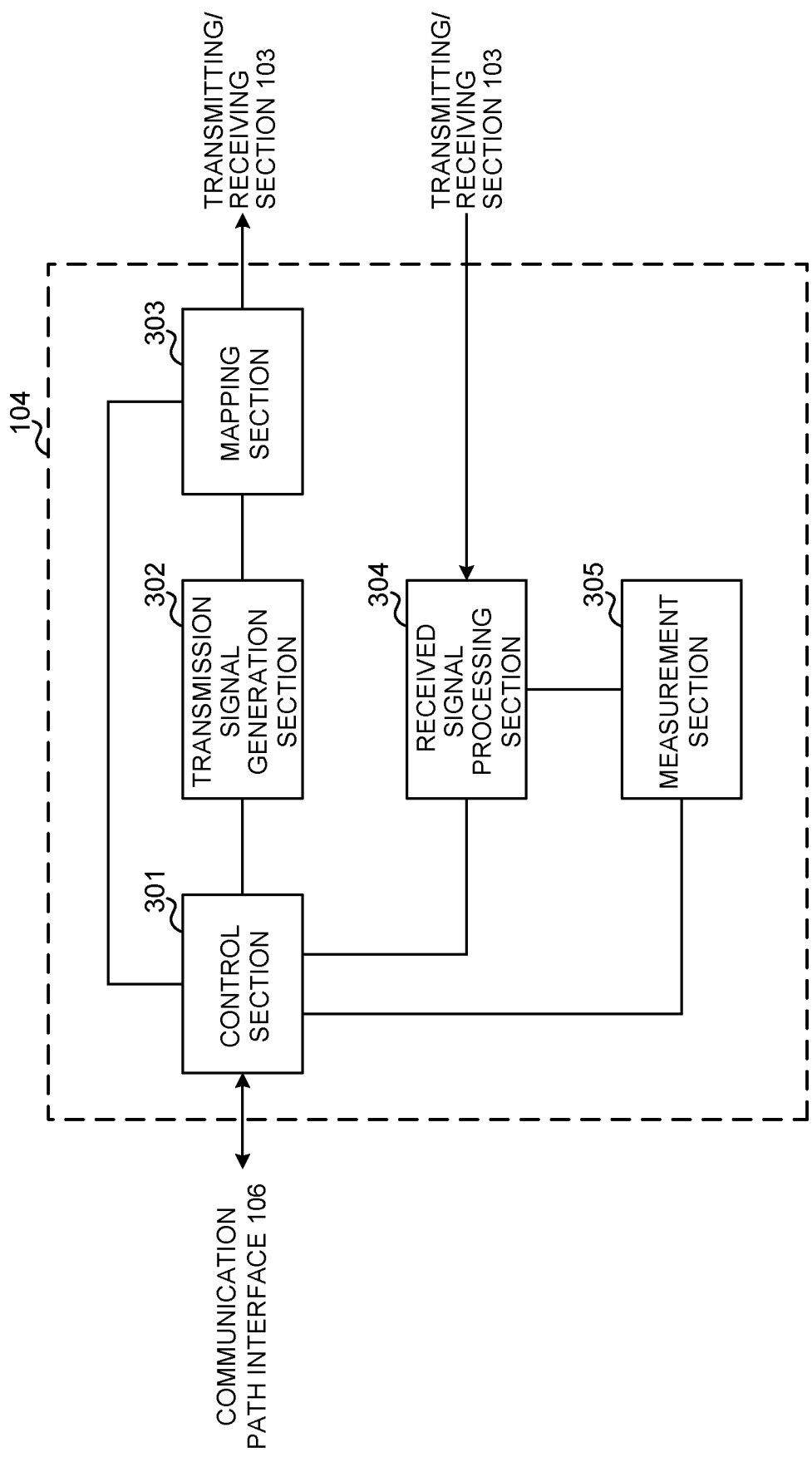
FIG. 12 is a diagram to show an example of a functional structure of a radio base station according to one embodiment of the present invention.

FIG. 12 is a diagram to show an example of functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of downlink data signals that are transmitted in the PDSCH and downlink control signals that are communicated in the PDCCH and/or the EPDCCH. The control section 301 controls the generation of downlink control signals (for example, delivery acknowledgement information and so on) and downlink data signals, based on the results of deciding whether or not retransmission control is necessary for uplink data signals, and so on. Also, the control section 301 controls the scheduling of downlink reference signals such as synchronization signals (for example, the PSS (Primary Synchronization Signal)/SSS (Secondary Synchronization Signal)), the CRS, the CSI-RS, the DM-RS and so on.

In addition, the control section 301 controls the scheduling of uplink data signals that are transmitted in the PUSCH, uplink control signals that are transmitted in the PUCCH and/or the PUSCH (for example, delivery acknowledgment information), random access preambles that are transmitted in the PRACH, uplink reference signals, and so on.

The control section 301 may exert control so that transmitting beams and/or receiving beams are formed using the digital BF (for example, precoding) by the baseband signal processing section 104 and/or the analog BF (for example, phase rotation) by the transmitting/receiving sections 103.

For example, the control section 301 may exert control so that, in a predetermined period (for example, in a sweep period), one or more beam-specific signals and/or channels (for example beam-specific SSs, beam-specific RSs, beam-specific BCHs (broadcast signals), etc.) are swept and transmitted.

Furthermore, the control section 301 may exert control so that, in the event a beam identification signal (and/or an on-demand information request) is received from the received signal processing section 304 (that is, upon receipt of a beam identification signal), on-demand information (for example, SI, multicast information, etc.) is transmitted.

The control section 301 may exert control so that a beam identification signal (for example, a PRACH, an on-demand information request, etc.) is received using sequences and/or resources that are associated with beam-specific signals that have been transmitted.

The control section 301 exerts control so that predetermined beams are identified (specified) based on beam identification signals, and predetermined information (such as on-demand information) is transmitted using these predetermined beams. The control section 301 may configure the predetermined information as beam-specific on-demand information that can be decoded by a plurality of user terminals 20, or configure the predetermined information as UE-specific on-demand information that can be decoded only in predetermined user terminals 20.

When a carrier apart from the carrier in which the beam-specific signals and/or channels are received is configured in the user terminals 20, the control section 301 may use this different carrier to receive beam identification signals and/or to transmit on-demand information.

The control section 301 may exert control so that transmission processes (for example, transmission, precoding, mapping, coding, etc.) for beam-specific signals/channels, data signals and others are performed based on the assumption that the subframe length in sweep periods and the subframe length in non-sweep periods are different.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

When signals are received, the measurement section 305 may measure, for example, the received power (for example, RSRP (Reference Signal Received Power)), the received quality (for example, RSRQ (Reference Signal Received Quality)), SINR (Signal to Interference plus Noise Ratio) and/or the like), channel states and so on. The measurement results may be output to the control section 301.

(User Terminal)

Figure 13:
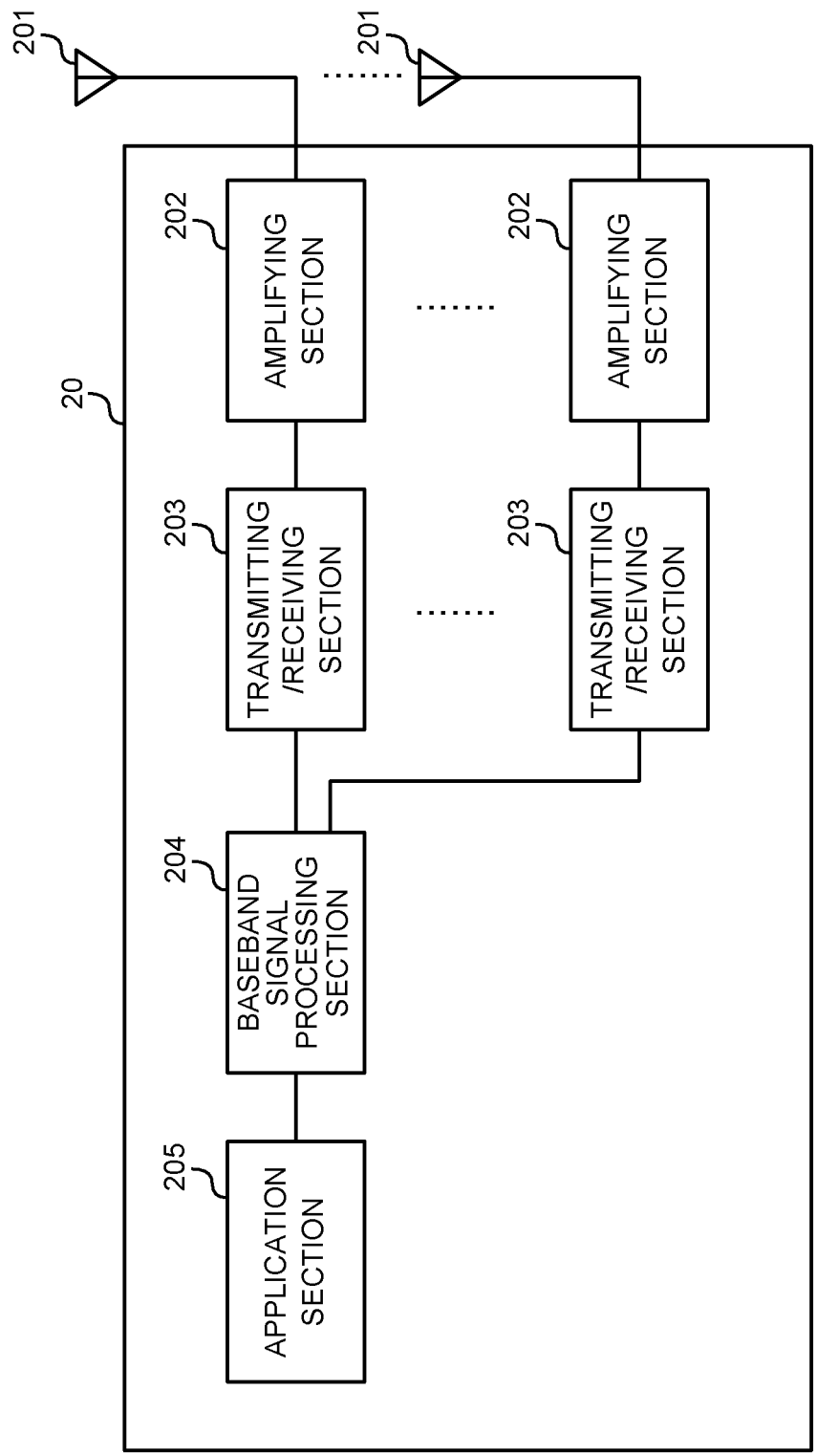
FIG. 13 is a diagram to show an example of an overall structure of a user terminal according to one embodiment of the present invention.

FIG. 13 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may furthermore have an analog beamforming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 201 may be constituted by, for example, array antennas.

The transmitting/receiving sections 203 receive signals transmitted from the radio base station 10 in beam-specific signals and/or beam-specific channels. Furthermore, the transmitting/receiving sections 203 may receive on-demand information that is transmitted in response to beam identification signals (on-demand information request signals) from the radio base station 10. The transmitting/receiving sections 203 may transmit beam identification signals (on-demand information request signals) to the radio base station 10.

Furthermore, the transmitting/receiving sections 203 may receive information about mapping patterns in which beam-specific signals are to be detected, information about the associations between beam identification signals (for example, sequences and/or resources of beam identification signals) and beam-specific signals (for example, the sequence indices of beam-specific signals, the symbol numbers where beam-specific signals are received, beam identification information of beams where beam-specific signals are transmitted, etc.), information about the transmission resource of on-demand information requests and so on, from the radio base station 10.

Figure 14:
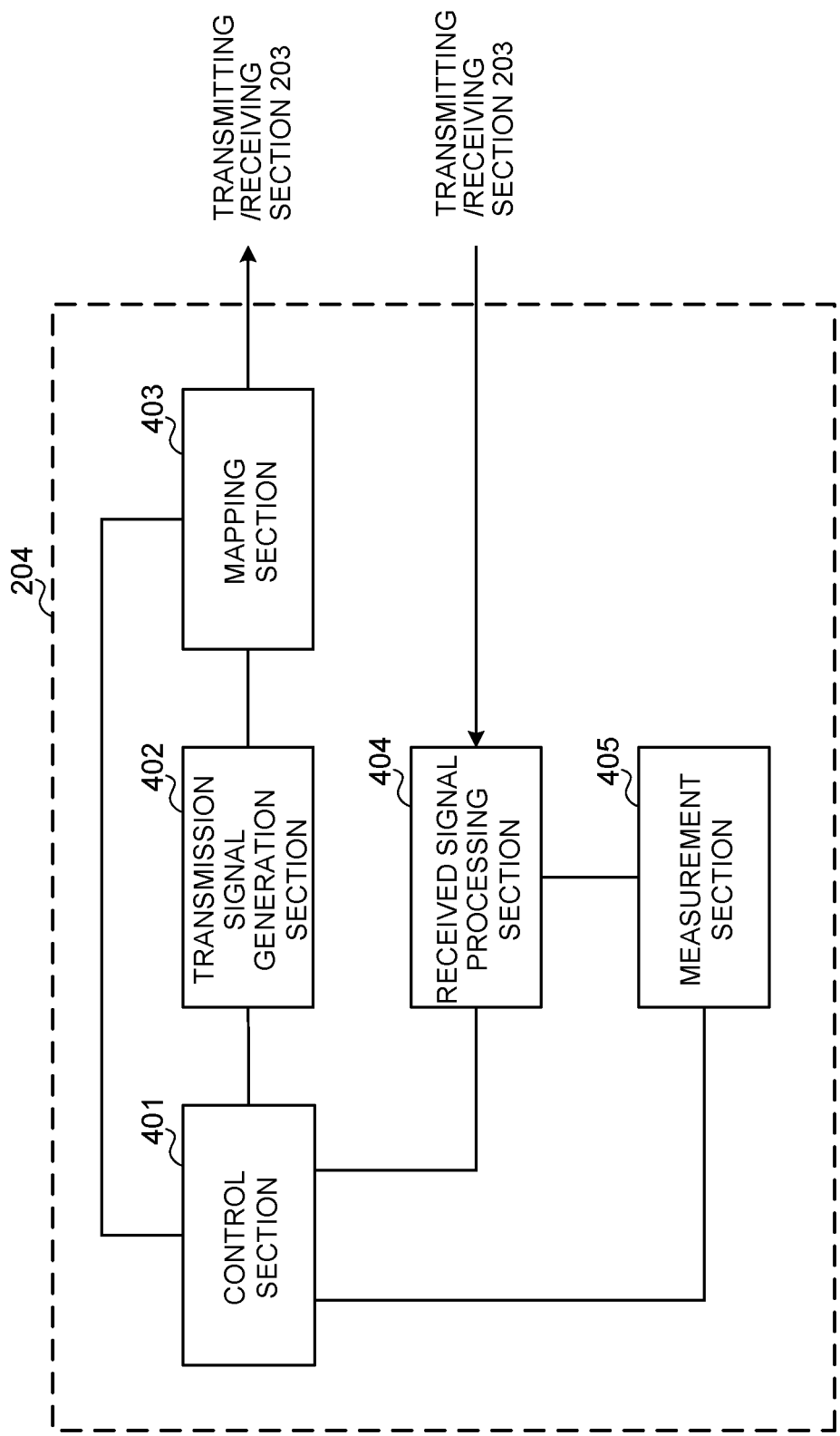
FIG. 14 is a diagram to show an example of a functional structure of a user terminal according to one embodiment of the present invention.

FIG. 14 is a diagram to show an example of a functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals (signals transmitted in the PDCCH/EPDCCH) and downlink data signals (signals transmitted in the PDSCH) transmitted from the radio base station 10, via the received signal processing section 404. The control section 401 controls the generation of uplink control signals (for example, delivery acknowledgement information and so on) and/or uplink data signals based on the results of deciding whether or not retransmission control is necessary for the downlink control signals and/or downlink data signals, and so on.

The control section 401 may exert control so that transmitting beams and/or receiving beams are formed using the digital BF (for example, precoding) by the baseband signal processing section 204 and/or the analog BF (for example, phase rotation) by the transmitting/receiving sections 203.

For example, the control section 401 may exert control for receiving at least one of multiple beam-specific signals and/or channels (for example beam-specific SSs, beam-specific RSs, beam-specific BCHs (broadcast signals), etc.) that are transmitted in a predetermined period (for example, a sweep period).

Furthermore, the control section 401 may exert control for transmitting signals (beam identification signals) for identifying (that is, for allowing the radio base station 10 to identify) beams which the user terminal 20 has detected or judged adequate. The control section 401 may exert control for transmitting signals for identifying the received beam-specific signals and/or channels as beam identification signals.

The beam identification signals may be PRACHs (random access preambles) or on-demand information requests that are defined apart from PRACHs. The control section 401 may exert control so that, based on a predetermined beam-specific signal that is received, at least one of the sequence and/or the resource of a PRACH and an on-demand information request is determined and transmitted.

When a carrier apart from the carrier in which the beam-specific signals and/or channels are received is configured in the user terminal 20, the control section 401 may use this different carrier to transmit beam identification signals and/or to receive on-demand information.

The control section 401 may exert control so that receiving processes (for example, receipt, detection, demapping, decoding, etc.) for beam-specific signals/channels, data signals and others are performed based on the assumption that the subframe length in sweep periods and the subframe length in non-sweep periods are different.

The control section 401 performs control for receiving predetermined information (such as on-demand information) transmitted in predetermined beams, which are identified by the beam identification signals. This predetermined information may be beam-specific on-demand information that can be decoded by a plurality of user terminals 20, or may be UE-specific on-demand information that can be decoded only by the user terminal 20.

Furthermore, when various kinds of information reported from the radio base station 10 are acquired via the received signal processing section 404, the control section 401 may update the parameters to use in control based on these pieces of information.

The transmission signal generation section 402 generates uplink signals (uplink control signals, uplink data signals, uplink reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals, the signals after the receiving processes and so on, to the measurement section 405.

The measurement section 405 conducts measurements with respect to the received signals. For example, the measurement section 405 performs measurements using the beamforming RS transmitted from the radio base station 10. The measurement section 405 can be constituted by a measurer, a measurement circuit or measurement apparatus that can be described based on general understanding of the technical field to which the present invention pertains.

The measurement section 405 may measure, for example, the received power (for example, RSRP), the received quality (for example, RSRQ, received SINR), the channel states and so on of the received signals. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 15:
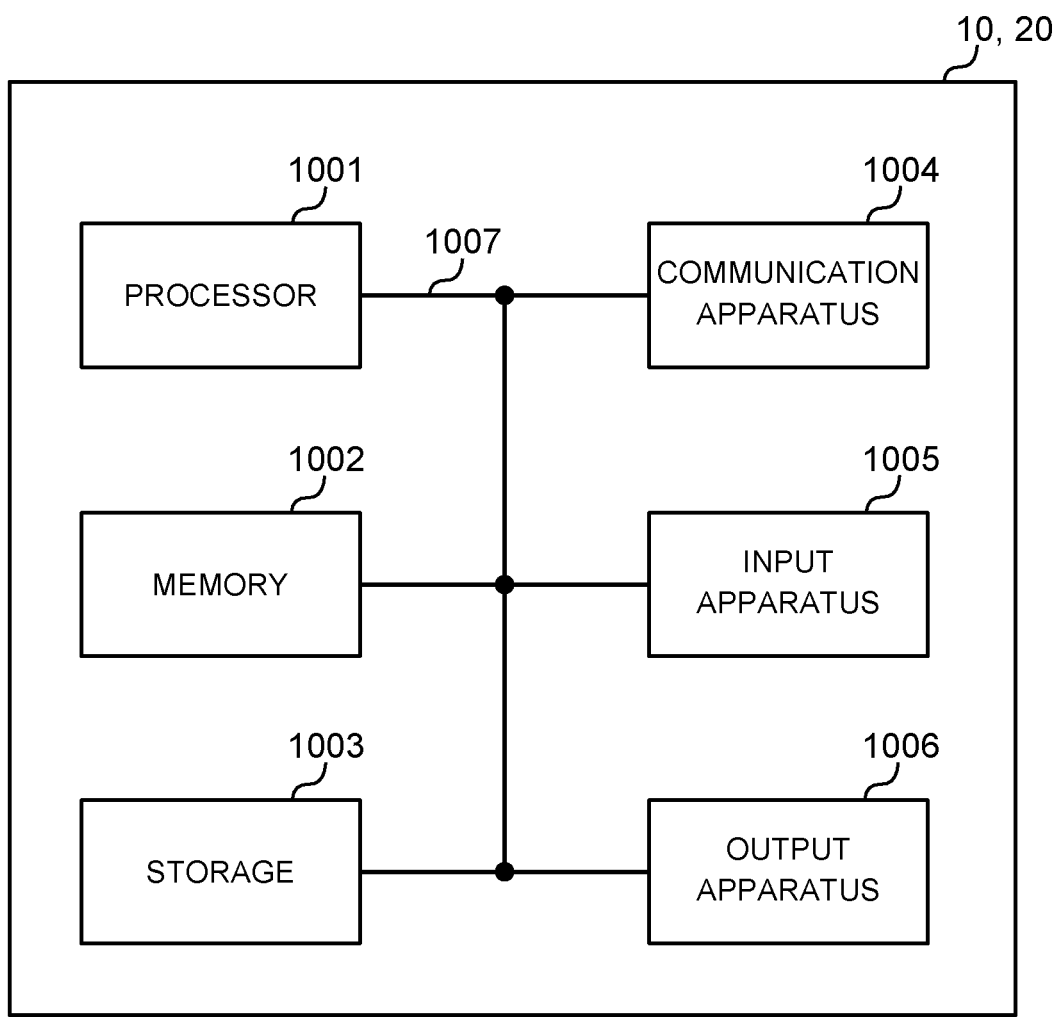
FIG. 15 is a diagram to show an example of a hardware structure of a radio base station and a user terminal according to one embodiment of the present invention.

For example, the radio base station, user terminals and so on according to embodiments of the present invention may function as a computer that executes the processes of the radio communication method of the present invention. FIG. 15 is a diagram to show an example hardware structure of a radio base station and a user terminal according to an embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by allowing predetermined software (programs) to be read on hardware such as the processor 1001 and the memory 1002, and by allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or signaling)." Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frames, a subframe, a slot and a symbol may be each called by other applicable names. For example, one subframe may be referred to as a "transmission time interval" (TTI), or a plurality of consecutive subframes may be referred to as a "TTI," or one slot may be referred to as a "TTI." That is, a subframe and a TTI may be a subframe (one ms) in existing LTE, may be a shorter period than one ms (for example, one to thirteen symbols), or may be a longer period of time than one ms.

Here, a TTI refers to the minimum time unit of scheduling in radio communication, for example. For example, in LTE systems, a radio base station schedules the allocation of radio resources (such as the frequency bandwidth and transmission power that can be used by each user terminal) for each user terminal in TTI units. Note that the definition of TTIs is not limited to this. TTIs may be the time unit for transmitting channel-encoded data packets (transport blocks), or may be the unit of processing in scheduling, link adaptation and so on.

A TTI having a time duration of one ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "shortened subframe," a "short subframe," or the like.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block" (PRB: Physical RB), a "PRB pair," an "RB pair," or the like.

Furthermore, a resource block may be comprised of one or more resource elements (REs). For example, one RE may be a radio resource field of one subcarrier and one symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration, the cyclic prefix (CP) duration and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information" (L1/L2 control signals), "L1 control information" (L1 control signal) and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The phrase "based on" as used in this specification does not mean "based only on," unless otherwise specified. In other words, the phrase "based on" means both "based only on" and "based at least on.

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency regions, microwave regions and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-093945, filed on May 9, 2016, including the specification, drawings and abstract, is incorporated herein by reference in its entirety.

The invention claimed is:

1. A terminal comprising:
a receiver that receives a group of a synchronization signal (SS), a broadcast channel (BCH) and a reference signal (RS); and
a processor that determines an index corresponding to a symbol position based on the RS, wherein a sequence of the RS varies depending on the symbol position; and
a transmitter that transmits a random access preamble for an on-demand information request using a resource corresponding to the index,
wherein the receiver receives the requested on-demand information that is transmitted in accordance with the random access preamble.

2. The terminal according to claim 1, wherein the on-demand information is system information.

3. The terminal according to claim 1, wherein the receiver receives a control channel which schedules the on-demand information, for a given period after the random access preamble is transmitted.

4. The terminal according to claim 2, wherein the receiver receives a control channel which schedules the on-demand information, for a given period after the random access preamble is transmitted.

5. A radio communication method for a terminal, comprising:
receiving a group of a synchronization signal (SS), a broadcast channel (BCH) and a reference signal (RS); and
determining an index corresponding to a symbol position based on the RS, wherein a sequence of the RS varies depending on the symbol position;
transmitting a random access preamble for an on-demand information request using a resource corresponding to the index; and
receiving the requested on-demand information that is transmitted in accordance with the random access preamble.

* * * * *